US012556833B2

(12) United States Patent
Kasashima

(10) Patent No.: US 12,556,833 B2
(45) Date of Patent: Feb. 17, 2026

(54) IMAGING ELEMENT AND ELECTRONIC DEVICE

(71) Applicant: SONY SEMICONDUCTOR SOLUTIONS CORPORATION, Kanagawa (JP)

(72) Inventor: Shunsuke Kasashima, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 72 days.

(21) Appl. No.: 18/703,822

(22) PCT Filed: Oct. 24, 2022

(86) PCT No.: PCT/JP2022/039463
§ 371 (c)(1),
(2) Date: Apr. 23, 2024

(87) PCT Pub. No.: WO2023/080000
PCT Pub. Date: May 11, 2023

(65) Prior Publication Data
US 2025/0260909 A1 Aug. 14, 2025

(30) Foreign Application Priority Data
Nov. 5, 2021 (JP) ................................. 2021-180820

(51) Int. Cl.
*H04N 25/57* (2023.01)
*H04N 25/11* (2023.01)
(52) U.S. Cl.
CPC ............. *H04N 25/57* (2023.01); *H04N 25/11* (2023.01)
(58) Field of Classification Search
CPC ........ H04N 25/57; H04N 25/11; H04N 25/70; H04N 25/585; H10F 39/12
See application file for complete search history.

(56) References Cited

U.S. PATENT DOCUMENTS

2006/0119726 A1* 6/2006 Oda ....................... H04N 23/70
348/E5.034
2011/0001861 A1* 1/2011 Tanaka ................. H04N 25/134
348/300
(Continued)

FOREIGN PATENT DOCUMENTS

JP 2011-015219 1/2011
JP 2017-163010 9/2017
WO WO 2017/098779 6/2017

OTHER PUBLICATIONS

English Translation of International Search Report prepared by the Japan Patent Office on Jan. 12, 2023, for International Application No. PCT/JP2022/039463, 2 pgs.

*Primary Examiner* — Timothy J Henn
(74) *Attorney, Agent, or Firm* — XSENSUS LLP

(57) ABSTRACT

The present technology relates to an imaging element and an electronic device capable of arranging pixels having different sizes efficiently. Provided are a first photoelectric converter that generate a charge corresponding to a light amount, and a second photoelectric converter having a smaller light receiving area than the first photoelectric converter, in which the first photoelectric converter has an L shape in plan view, the second photoelectric converter has a quadrangular shape, and a shape obtained by combining the first photoelectric converter and the second photoelectric converter is a quadrangular shape. The present technology can be applied to, for example, an imaging apparatus that acquires an image with a wide dynamic range by arranging pixels having different light receiving areas and processing signals from each of the pixels.

20 Claims, 37 Drawing Sheets

(56) References Cited

U.S. PATENT DOCUMENTS

| | | | |
|---|---|---|---|
| 2016/0156862 A1* | 6/2016 | Yoshimura | H04N 25/78 348/308 |
| 2018/0040651 A1 | 2/2018 | Lee et al. | |
| 2018/0182806 A1* | 6/2018 | Jin | H10F 39/805 |
| 2018/0351013 A1* | 12/2018 | Yokogawa | H10F 39/8053 |
| 2023/0268365 A1* | 8/2023 | Kurata | H10F 30/225 257/432 |

* cited by examiner

IMAGING ELEMENT AND ELECTRONIC DEVICE

CROSS REFERENCE TO RELATED APPLICATIONS

This application is a national stage application under 35 U.S.C. 371 and claims the benefit of PCT Application No. PCT/JP2022/039463, having an international filing date of 24 Oct. 2022, which designated the United States, which PCT application claimed the benefit of Japanese Patent Application No. 2021-180820, filed 5 Nov. 2021, the entire disclosures of each of which are incorporated herein by reference.

TECHNICAL FIELD

The present technology relates to an imaging element and an electronic device, and, for example, relates to an imaging element and an electronic device capable of expanding a dynamic range.

BACKGROUND ART

Conventionally, as a method for generating an image with a wide dynamic range, there is known a method in which a first pixel and a second pixel having different sensitivities are provided on a pixel array such as a complementary metal-oxide semiconductor (CMOS) image sensor, and a first image and a second image including respective outputs are synthesized.

Here, as a method for providing pixels having different sensitivities, for example, there is a method of providing a pixel having a long exposure time and a pixel having a short exposure time, or providing a pixel having a large size (hereinafter, referred to as a large pixel) and a pixel having a small size (hereinafter, referred to as a small pixel) of a photoelectric converter such as a photodiode (PD) (see, for example, Patent Document 1).

CITATION LIST

Patent Document

Patent Document 1: Japanese Patent Application Laid-Open No. 2017-163010

SUMMARY OF THE INVENTION

Problems to be Solved by the Invention

In recent years, with the progress of miniaturization of pixels, even in a case where a wide dynamic range image is generated by providing a large pixel and a small pixel, it is desirable to further downsize the large pixel and the small pixel and efficiently arrange the large pixel and the small pixel so as not to generate a useless region as much as possible.

The present technology has been made in view of such a situation and enables pixels having different sizes to be disposed efficiently.

Solutions to Problems

An imaging element according to one aspect of the present technology includes a first photoelectric converter that generate a charge corresponding to a light amount, and a second photoelectric converter having a smaller light receiving area than the first photoelectric converter, in which the first photoelectric converter has an L shape in plan view, the second photoelectric converter has a quadrangular shape, and a shape obtained by combining the first photoelectric converter and the second photoelectric converter is a quadrangular shape.

An electronic device according to one aspect of the present technology includes an imaging element, and a processor that processes a signal from the imaging element, the imaging element including a first photoelectric converter that generate a charge corresponding to a light amount, and a second photoelectric converter having a smaller light receiving area than the first photoelectric converter, in which the first photoelectric converter has an L shape in plan view, the second photoelectric converter has a quadrangular shape, and a shape obtained by combining the first photoelectric converter and the second photoelectric converter is a quadrangular shape.

An imaging element according to one aspect of the present technology includes a first photoelectric converter that generates a charge corresponding to a light amount, and a second photoelectric converter having a smaller light receiving area than the first photoelectric converter. The first photoelectric converter has an L shape in plan view, the second photoelectric converter has a quadrangular shape, and a shape obtained by combining the first photoelectric converter and the second photoelectric converter is a quadrangular shape.

An electronic device according to one aspect of the present technology includes the imaging element.

Note that the electronic device may be independent devices, or may be internal blocks that form one device.

Note that a program to be provided may be transmitted via a transmission medium or be recorded on a recording medium.

MODE FOR CARRYING OUT THE INVENTION

Hereinafter, modes for carrying out the present technology (hereinafter referred to as embodiments) will be described.

Configuration of Imaging Apparatus

Figure 1:
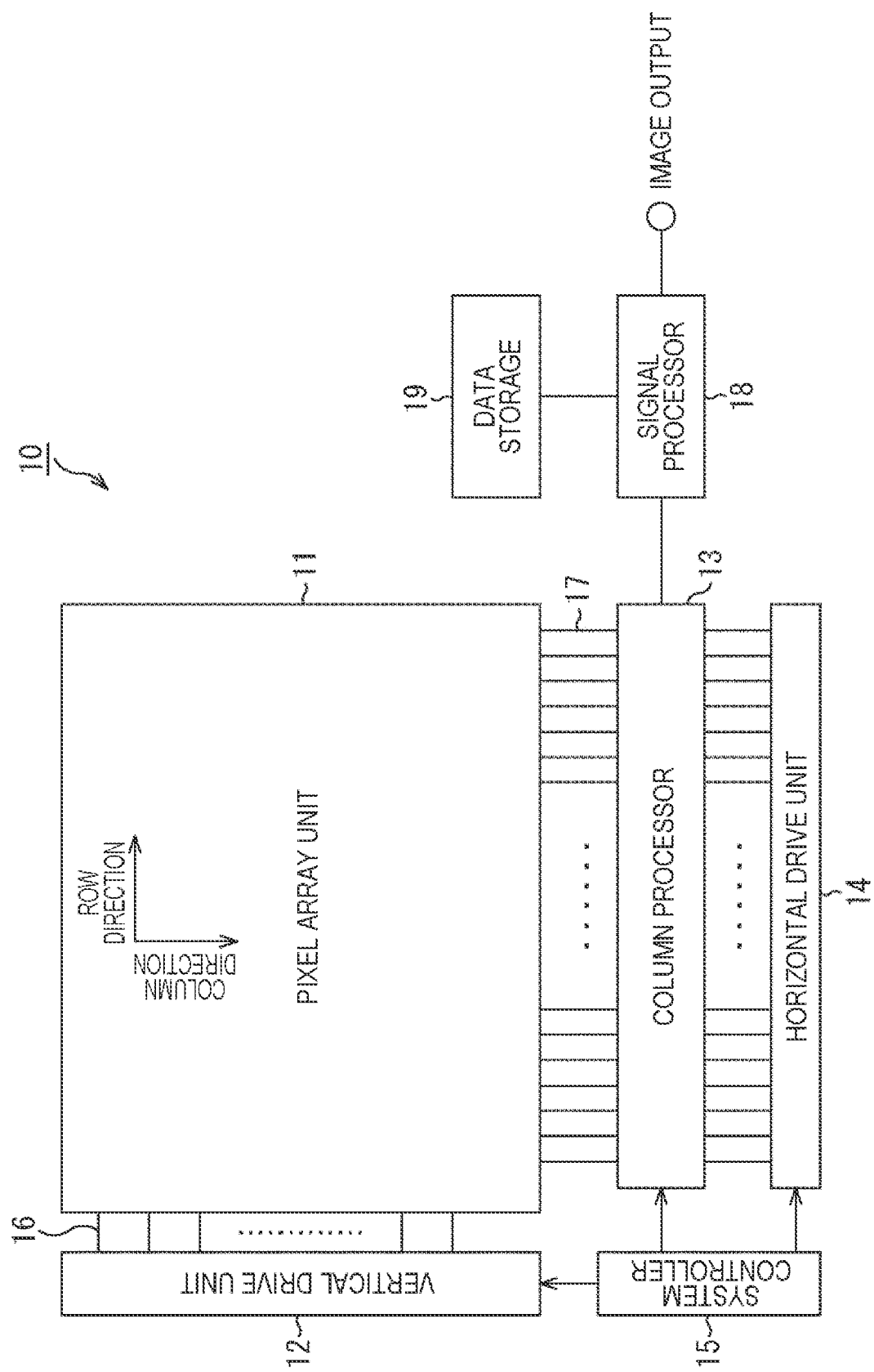
FIG. 1 is a diagram illustrating a configuration of an embodiment of an imaging apparatus to which the present technology is applied.

FIG. 1 is a system configuration diagram schematically illustrating a configuration of an imaging apparatus to which the present technology is applied, for example, a CMOS image sensor as one type of an X-Y address type imaging apparatus. Here, the CMOS image sensor is an image sensor created by applying or partially using a CMOS process. For example, the imaging apparatus includes a back-illuminated CMOS image sensor.

An imaging apparatus 10 includes a pixel array unit 11 formed on a semiconductor substrate (chip) (not illustrated) and a peripheral circuit unit integrated on the same semiconductor substrate as the pixel array unit 11. The peripheral circuit unit includes, for example, a vertical drive unit 12, a column processor 13, a horizontal drive unit 14, and a system controller 15.

The imaging apparatus 10 further includes a signal processor 18 and a data storage 19. Each processing of the signal processor 18 and the data storage 19 includes processing performed by an external signal processor provided on a substrate separately from the imaging apparatus 10, for example, processing performed by a digital signal processor (DSP) circuit or software.

The pixel array unit 11 has a configuration in which unit pixels (hereinafter, may be simply described as "pixels") having a photoelectric converter that generates and accumulates charges according to an amount of received light are two-dimensionally arranged in a row direction and a column direction, that is, in a matrix. Here, the row direction refers to an arrangement direction of the pixels in a pixel row (that is, a horizontal direction), and the column direction refers to an arrangement direction of the pixels in a pixel column (that is, a vertical direction). A specific circuit configuration and a pixel structure of the unit pixel will be described later in detail.

In the pixel array unit 11, a pixel drive line 16 is wired along the row direction for every pixel row, and a vertical signal line 17 is wired along the column direction for every pixel column with respect to a matrix pixel arrangement. The pixel drive line 16 transmits a drive signal for performing driving to read a signal from a pixel. Note that in FIG. 1, the pixel drive line 16 is illustrated as one wire but is not limited to one. One end of the pixel drive line 16 is connected to an output end corresponding to each row of the vertical drive unit 12.

The vertical drive unit 12 includes a shift register, an address decoder, and the like and drives each pixel of the pixel array unit 11 at the same time for all the pixels, in units of rows, or the like. That is, the vertical drive unit 12 constitutes a drive unit that controls operation of each pixel of the pixel array unit 11 together with the system controller 15 that controls the vertical drive unit 12. Although a specific configuration of the vertical drive unit 12 is not illustrated, the vertical drive unit 12 generally includes two scanning systems of a read scanning system and a sweep scanning system.

The read scanning system selectively scans the unit pixels in the pixel array unit 11 sequentially on a row-by-row basis in order to read signals from the unit pixels. The signal read from the unit pixel is an analog signal. The sweep scanning system performs sweep scanning on a read row on which the read scanning is to be performed by the read scanning system earlier than the read scanning by an exposure time.

When the sweep scanning is performed by the sweep scanning system, an unnecessary charge is swept from the photoelectric converter of the unit pixel in the read row. Therefore, the photoelectric converter is reset. Then, when the unnecessary charge is swept (reset) by the sweep scanning system, a so-called electronic shutter operation is performed. Here, the electronic shutter operation refers to operation of discharging the charge of the photoelectric converter and newly starting exposure (starting accumulation of charges).

The signal read by the read operation of the read scanning system corresponds to the amount of the received light after the immediately preceding read operation or electronic shutter operation. Then, a period from a read timing in the immediately preceding read operation or a sweep timing in the electronic shutter operation to a read timing in the current read operation is an exposure period of the charge in the unit pixel.

The signal output from each unit pixel in the pixel row selectively scanned by the vertical drive unit 12 is input to the column processor 13 through each of the vertical signal lines 17 for every pixel column. The column processor 13 performs, for every pixel column of the pixel array unit 11, a predetermined signal processing on the signal output through the vertical signal line 17 from each pixel in a selected row, and temporarily holds a pixel signal which have been subjected to the signal processing.

Specifically, the column processor 13 performs, as signal processing, at least noise removal processing, for example, correlated double sampling (CDS) processing or double data sampling (DDS) processing. For example, in the CDS processing, fixed pattern noise unique to the pixel, such as reset noise or threshold variation of an amplification transistor in the pixel, is removed. The column processor 13 may have, for example, an analog-digital (AD) conversion function in addition to the noise removal processing, and convert an analog pixel signal into a digital signal and output the digital signal.

The horizontal drive unit 14 includes a shift register, an address decoder, and the like, and sequentially selects a unit circuit corresponding to the pixel column in the column processor 13. When the selective scanning is performed by the horizontal drive unit 14, the pixel signal subjected to the signal processing for every unit circuit in the column processor 13 is sequentially output.

The system controller 15 includes a timing generator that generates various timing signals and the like, and performs drive control for the vertical drive unit 12, the column processor 13, the horizontal drive unit 14, and the like on the basis of various timings generated by the timing generator.

The signal processor 18 has at least an arithmetic processing function, and performs various signal processing such as arithmetic processing on the pixel signal output from the column processor 13. The data storage 19 temporarily stores data necessary for signal processing when the signal processing is performed by the signal processor 18.

Circuit Configuration of Unit Pixel

Figure 2:
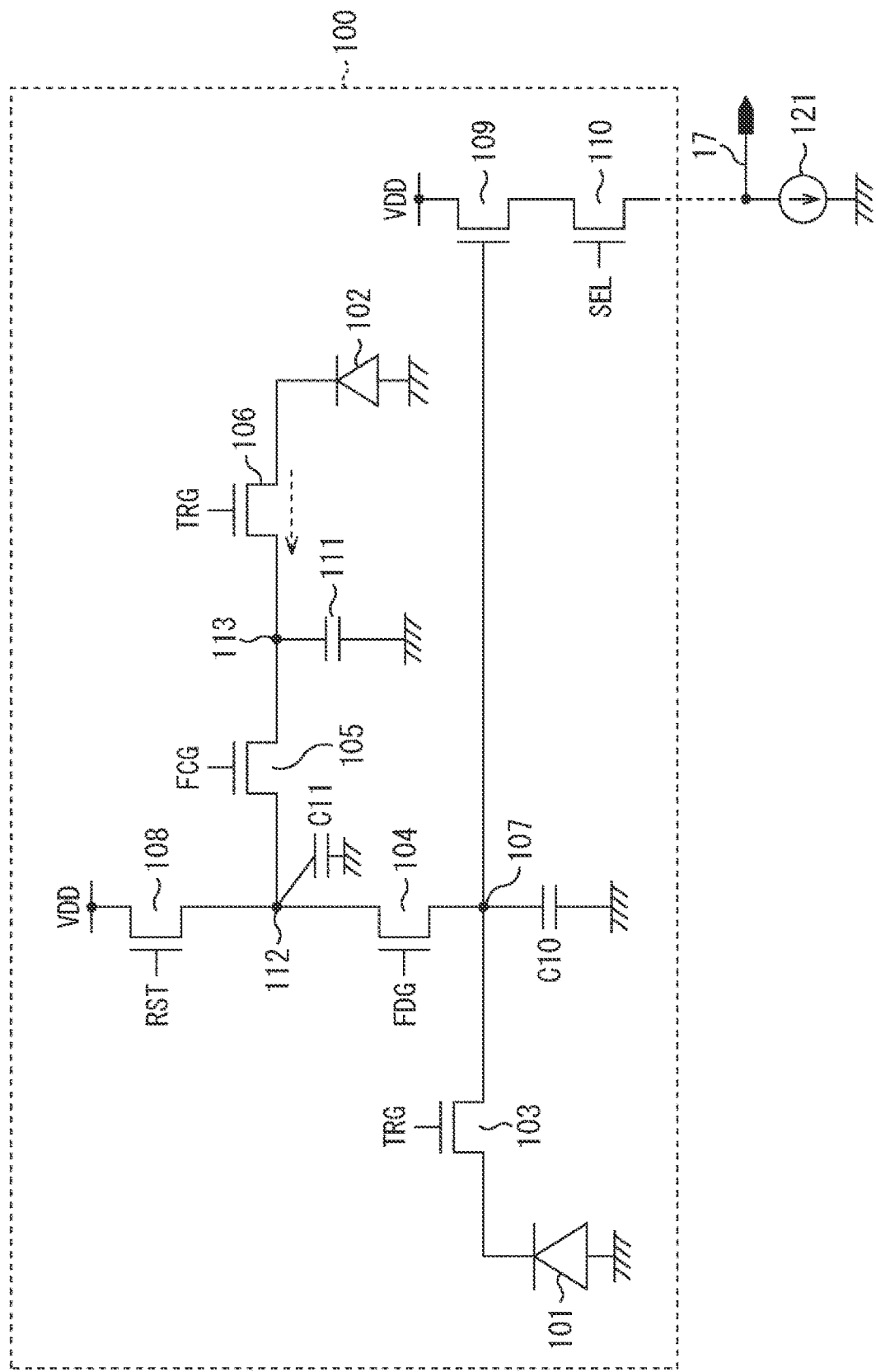
FIG. 2 is a circuit diagram of a unit pixel.

FIG. 2 is a circuit diagram illustrating a configuration example of a unit pixel 100 disposed in the pixel array unit 11 of FIG. 1.

The unit pixel 100 includes a first photoelectric converter 101, a second photoelectric converter 102, a first transfer transistor 103, a second transfer transistor 104, a third transfer transistor 105, a fourth transfer transistor 106, a floating diffusion (FD) unit 107, a reset transistor 108, an amplification transistor 109, and a selection transistor 110.

The reset transistor 108 and the amplification transistor 109 are connected to a power supply VDD. The first photoelectric converter 101 includes a so-called embedded photodiode in which an n-type impurity region is formed inside a p-type impurity region formed in a silicon semiconductor substrate. Similarly, the second photoelectric converter 102 includes an embedded photodiode. The first photoelectric converter 101 and the second photoelectric converter 102 generate signal charges corresponding to the amount of received light, and accumulate the generated charges to a certain amount.

The unit pixel 100 further includes a charge accumulator 111. The charge accumulator 111 is, for example, a MOS capacitance or a MIS capacitance.

In FIG. 2, the first transfer transistor 103, the second transfer transistor 104, the third transfer transistor 105, and the fourth transfer transistor 106 are connected in series between the first photoelectric converter 101 and the second photoelectric converter 102. A floating diffusion layer connected between the first transfer transistor 103 and the second transfer transistor 104 serves as the FD unit 107. The FD unit 107 is provided with a parasitic capacitance C10.

A floating diffusion layer connected between the second transfer transistor 104 and the third transfer transistor 105 serves as a node 112. The node 112 is provided with a parasitic capacitance C11. A floating diffusion layer connected between the third transfer transistor 105 and the fourth transfer transistor 106 serves as a node 113. The charge accumulator 111 is connected to the node 113.

For the unit pixel 100, a plurality of drive lines as the pixel drive lines 16 in FIG. 1 is wired, for example, for each pixel row. Then, various drive signals TGL, FDG, FCG, TGS, RST, and SEL are supplied from the vertical drive unit 12 in FIG. 1 via the plurality of drive lines. Since each transistor of the unit pixel 100 is an NMOS transistor, these drive signals are pulse signals that enter an active state in a high level state (for example, power supply voltage VDD) and enter an inactive state in a low level state (for example, negative potential).

The drive signal TGL is applied to a gate electrode of the first transfer transistor 103. When the drive signal TGL enters the active state, the first transfer transistor 103 enters a conductive state, and the charges accumulated in the first photoelectric converter 101 are transferred to the FD unit 107 via the first transfer transistor 103.

The drive signal FDG is applied to a gate electrode of the second transfer transistor 104. When the drive signal FDG enters the active state and the second transfer transistor 104 enters the conductive state, potentials of the FD unit 107 and the node 112 are thereby coupled to form one charge accumulation region.

The drive signal FCG is applied to a gate electrode of the third transfer transistor 105. When the drive signal FDG and the drive signal FCG enter the active state and the second transfer transistor 104 and the third transfer transistor 105 enter the conductive state, potentials from the FD unit 107 to the charge accumulator 111 are coupled to form one charge accumulation region.

The drive signal TGS is applied to a gate electrode of the fourth transfer transistor 106. When the drive signal TGS enters the active state, the fourth transfer transistor 106 enters the conductive state, and the charges accumulated in the second photoelectric converter 102 are transferred to the charge accumulator 111 via the fourth transfer transistor 106. In a case where the fourth transfer transistor 106, the third transfer transistor 105, and the second transfer transistor 104 are in the active state, the potentials from the charge accumulator 111 to the FD unit 107 are coupled, and the charges accumulated in the second photoelectric converter 102 are transferred to the coupled charge accumulation region.

Furthermore, in a channel region under the gate electrode of the fourth transfer transistor 106, for example, the potential is in a slightly positive direction (in other words, the potential is slightly deeper) as compared with a channel region under the gate electrode of the first transfer transistor 103, the second transfer transistor 104, or the third transfer transistor 105, and thus, an overflow path of charges is formed. In a case where a charge exceeding a saturation charge amount of the second photoelectric converter 102 is generated as a result of the photoelectric conversion in the second photoelectric converter 102, the charge exceeding the saturation charge amount overflows from the second photoelectric converter 102 to the charge accumulator 111 through the overflow path described above. The overflowed charge is accumulated in the charge accumulator 111.

Note that, hereinafter, the overflow path formed in the channel region below the gate electrode of the fourth transfer transistor 106 is simply referred to as an overflow path of the fourth transfer transistor 106.

In FIG. 2, among the two electrodes included in the charge accumulator 111, a first electrode is a node electrode connected to the node 113 between the third transfer transistor 105 and the fourth transfer transistor 106. Among the two electrodes included in the charge accumulator 111, a second electrode is a grounded electrode.

Note that, as a modification, the second electrode may be connected to a specific potential other than the ground potential, for example, a power supply potential.

In a case where the charge accumulator 111 is a MOS capacitance or a MIS capacitance, as an example, the second electrode is an impurity region formed on a silicon substrate, and a dielectric film that forms the capacitance is an oxide film or a nitride film formed on the silicon substrate. The first electrode is an electrode including a conductive material, for example, polysilicon or metal, above the second electrode and the dielectric film.

In a case where the second electrode is a ground potential, the second electrode may be a p-type impurity region electrically connected to a p-type impurity region provided in the first photoelectric converter 101 or the second photoelectric converter 102. In a case where the second electrode is a specific potential other than a ground potential, the second electrode may be an n-type impurity region formed in the p-type impurity region.

In addition to the second transfer transistor 104, the reset transistor 108 is also connected to the node 112. A specific potential, for example, a power supply VDD is connected ahead of the reset transistor. The drive signal RST is applied to a gate electrode of the reset transistor 108. When the drive signal RST enters the active state, the reset transistor 108 enters the conductive state, and the potential of the node 112 is reset to a level of the voltage VDD.

When the drive signal FDG of the second transfer transistor 104 and the drive signal FCG of the third transfer transistor 105 are set to the active state when the drive signal RST is set to the active state, the coupled potentials of the node 112, the FD unit 107, and the charge accumulator 111 are reset to the level of the voltage VDD.

Note that by individually controlling the drive signal FDG and the drive signal FCG, the potentials of the FD unit 107 and the charge accumulator 111 may be reset alone (independently) to the level of the voltage VDD.

The FD unit 107 which is a floating diffusion layer is charge-voltage conversion means. That is, when the charge is transferred to the FD unit 107, the potential of the FD unit 107 changes in accordance with the amount of the transferred charge.

In the amplification transistor 109, a current source 121 connected to one end of the vertical signal line 17 is connected to a source side, and the power supply VDD is connected to a drain side to form a source follower circuit altogether. The FD unit 107 is connected to a gate electrode of the amplification transistor 109 to serve as an input of the source follower circuit.

The selection transistor 110 is connected between a source of the amplification transistor 109 and the vertical signal line 17. The drive signal SEL is applied to a gate electrode of the selection transistor 110. When the drive signal SEL is brought into the active state, the selection transistor 110 enters the conductive state, and the unit pixel 100 enters a selection state.

When the charges are transferred to the FD unit 107, the potential of the FD unit 107 becomes a potential corresponding to the amount of transferred charges, and the potential is input to the source follower circuit described above. When the drive signal SEL enters the active state, the potential of the FD unit 107 corresponding to the amount of charges is output to the vertical signal line 17 via the selection transistor 110 as an output of the source follower circuit.

The first photoelectric converter 101 has a larger light receiving area of the photodiode than the second photoelectric converter 102. Therefore, in a case where a subject with predetermined illuminance is imaged with a predetermined exposure time, the charge generated in the first photoelectric converter 101 is larger than the charge generated in the second photoelectric converter 102.

Therefore, when the charge generated in the first photoelectric converter 101 and the charge generated in the second photoelectric converter 102 are transferred to the FD unit 107 and subjected to charge-voltage conversion, a voltage change before and after transferring the charge generated in the first photoelectric converter 101 to the FD unit 107 is larger than a voltage change before and after transferring the charge generated in the second photoelectric converter 102 to the FD unit 107. As a result, comparing the first photoelectric converter 101 with the second photoelectric converter 102, the first photoelectric converter 101 has higher sensitivity than the second photoelectric converter 102.

On the other hand, even in a case where light with high illuminance is incident and a charge exceeding the saturation charge amount of the second photoelectric converter 102 is generated, the second photoelectric converter 102 can accumulator the charge generated exceeding the saturation charge amount in the charge accumulator 111. Therefore, when charge-voltage conversion is performed on the charge generated in the second photoelectric converter 102, charge-voltage conversion can be performed after both the charge accumulated in the second photoelectric converter 102 and the charge accumulated in the charge accumulator 111 are added.

Therefore, the second photoelectric converter 102 can capture an image having gradation over a wider illuminance range, in other words, capture an image having a wider dynamic range, than the first photoelectric converter 101.

Two images of an image with high sensitivity captured with the first photoelectric converter 101 and an image with a wide dynamic range captured with the second photoelectric converter 102 are synthesized into one image through wide dynamic range image synthesis processing of synthesizing one image from the two images in, for example, an image signal processing circuit provided inside the imaging apparatus 10 or an image signal processing device connected to the outside of the imaging apparatus 10.

Configuration Example of Unit Pixel

Figure 3:
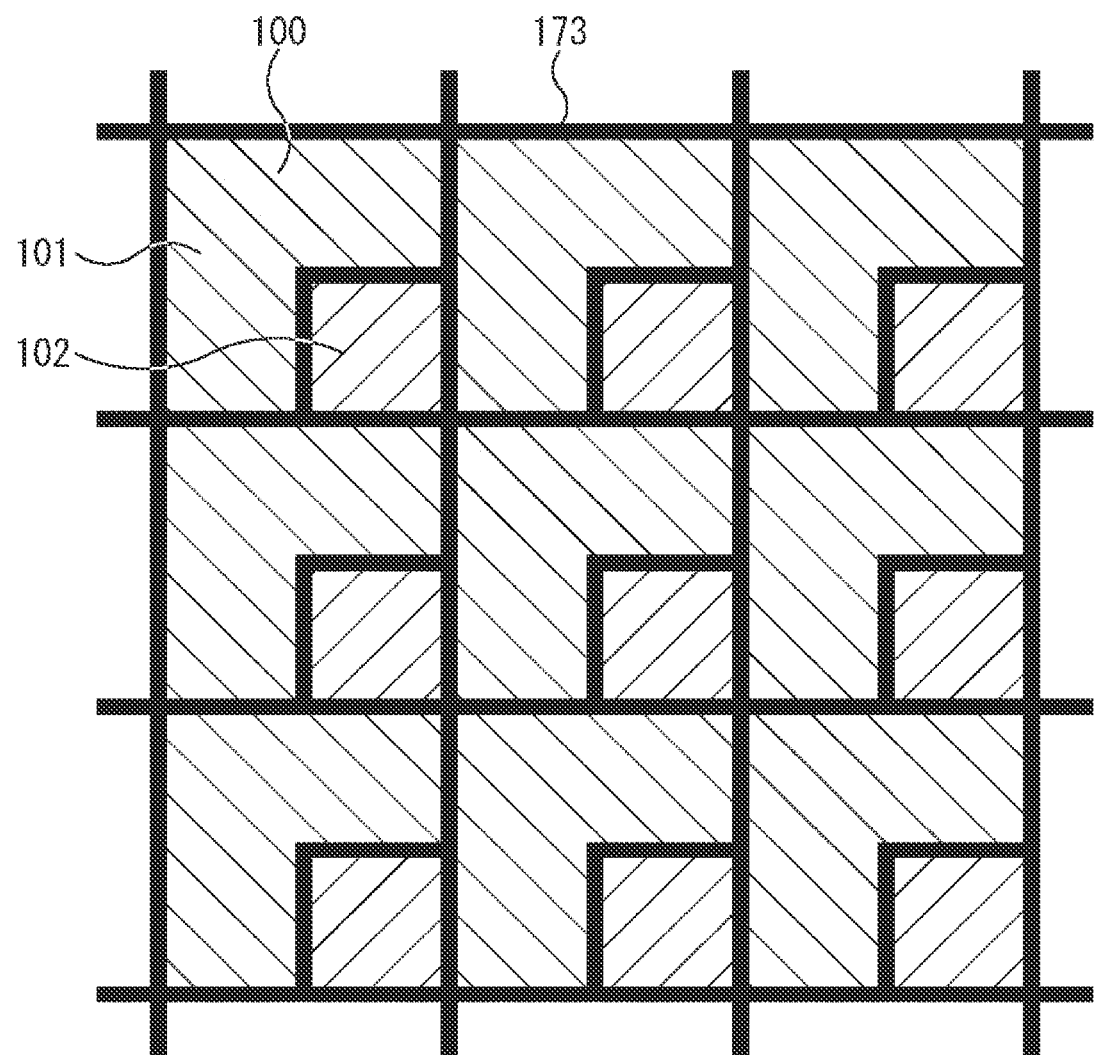
FIG. 3 is a diagram for describing a unit pixel disposed in a pixel array unit.

FIG. 3 is a diagram illustrating a planar configuration example of the unit pixel 100 disposed in the pixel array unit 11. FIG. 3 exemplifies nine unit pixels 100 in 3×3 disposed in the pixel array unit 11.

The unit pixel 100 includes the first photoelectric converter 101 having an L shape and the second photoelectric converter 102 having a quadrangular shape. The first photoelectric converter 101 and the second photoelectric converter 102 are combined, in other words, the unit pixel 100 has a quadrangular shape (square in FIG. 3).

In the following description, an L shape is described, but the L shape is a shape divided into a longitudinal line and a lateral line, and the lengths of the longitudinal line and the lateral line are different. In the present embodiment, a case where the lengths of the longitudinal line and the lateral line are the same is also included in the L shape. The L shape also includes shapes in a case where L is rotated by 90 degrees, 180 degrees, and 270 degrees.

In the pixel array unit 11, the unit pixels 100 each including the first photoelectric converter 101 and the second photoelectric converter 102 are disposed in a matrix. The unit pixels 100 are isolated by an inter-pixel isolator 173 (described later with reference to FIG. 9). The inter-pixel isolator 173 is also formed between the first photoelectric converter 101 and the second photoelectric converter 102, and the first photoelectric converter 101 and the second photoelectric converter 102 are isolated by the inter-pixel isolator 173.

Figure 4:
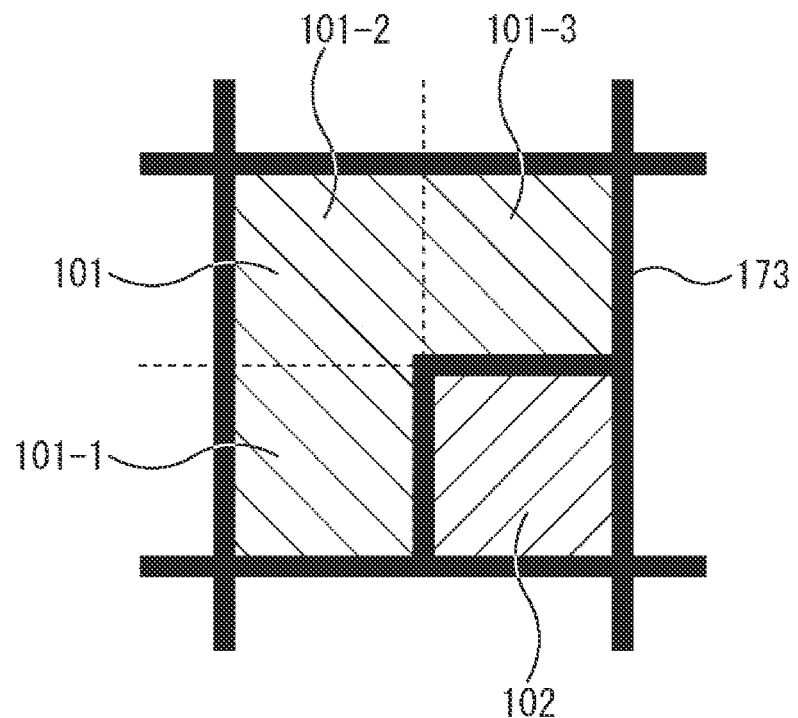
FIG. 4 is a diagram for describing a configuration of the unit pixel.

FIG. 4 illustrates one unit pixel 100, and the configuration of the unit pixel 100 will be further described. In a case where the size of the second photoelectric converter 102 is one, the size of the first photoelectric converter 101 is about three. As indicated by a dotted line in FIG. 4, the first photoelectric converter 101 is divided into three units of a first photoelectric converter 101-1, a first photoelectric converter 101-2, and a first photoelectric converter 101-3. The first photoelectric converter 101-1 is located at the lower left of the unit pixel 100 in the drawing, the first photoelectric converter 101-2 is located at the upper left of the unit pixel 100 in the drawing, and the first photoelectric converter 101-3 is located at the upper right of the unit pixel 100 in the drawing.

It is assumed that the first photoelectric converter 101-1, the first photoelectric converter 101-2, and the first photoelectric converter 101-3 are regions having an equal light receiving area. Each of the first photoelectric converter 101-1, the first photoelectric converter 101-2, and the first photoelectric converter 101-3 has an equal size (area) to the size of the second photoelectric converter 102. That is, the first photoelectric converter 101 has an area about three times the area of the second photoelectric converter 102. The first photoelectric converter 101-1, the first photoelectric converter 101-2, and the first photoelectric converter 101-3 are respectively disposed at the lower left, upper left, and upper right of the unit pixel 100 as described above, and so disposed in an L shape.

In the first photoelectric converter 101-1, the first photoelectric converter 101-2, and the first photoelectric converter 101-3, for example, N-type impurity regions are continuously formed in the silicon substrate to form one photoelectric converter.

The first photoelectric converter 101 has an L shape and is formed as a region having a light receiving area three times the light receiving area of the second photoelectric converter 102. The unit pixel 100 includes a large pixel having a light receiving area three times the light receiving area of the second photoelectric converter 102 and a small pixel having a light receiving area one third of the light receiving area of the first photoelectric converter 101. In a case where viewed in the unit pixel 100, a three fourths region of the unit pixel 100 is the first photoelectric converter 101 (large pixel), and a one fourth region is the second photoelectric converter 102 (small pixel).

The first photoelectric converter 101 is configured in an L shape, and the second photoelectric converter 102 is configured to be accommodated in a recessed region of the L-shaped first photoelectric converter 101. Then, the first photoelectric converter 101 and the second photoelectric converter 102 can be efficiently disposed without generating an unnecessary gap between the first photoelectric converter 101 and the second photoelectric converter 102.

Note that, here, a case where the first photoelectric converter 101 has a size three times as large as the size of the second photoelectric converter 102 will be described as an example. However, the light receiving area of the second photoelectric converter 102 that is a small pixel can be configured to be small (configured to have a size of one or less in a case where the size of the second photoelectric converter 102 illustrated in FIG. 3 is one). In such a case, the size of the first photoelectric converter 101 is three times or more as large as the size of the second photoelectric converter 102. The present technology can be applied to a case where the size of the first photoelectric converter 101 (the size of the large pixel) is three times or more as large as the size of the second photoelectric converter 102 (the size of the small pixel), and is not limited to three times.

The description will be continued where the first photoelectric converter 101 is virtually divided into the first photoelectric converter 101-1, the first photoelectric converter 101-2, and the first photoelectric converter 101-3 as necessary.

Arrangement of On-Chip Lenses

Figure 5:
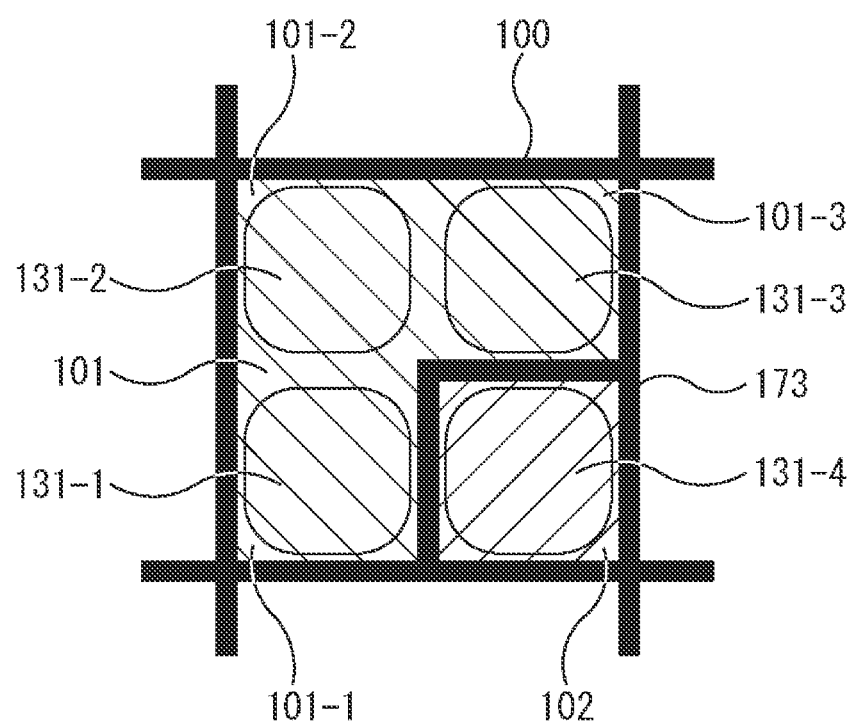
FIG. 5 is a diagram for describing an arrangement example of on-chip lenses.

The arrangement of on-chip lenses will be described with reference to FIGS. 5 to 7. FIG. 5 illustrates an example in which a plurality of on-chip lenses 131 is disposed on the first photoelectric converter 101.

Referring to FIG. 5, an on-chip lens 131-1, an on-chip lens 131-2, and an on-chip lens 131-3 are disposed on the first photoelectric converter 101-1, the first photoelectric converter 101-2, and the first photoelectric converter 101-3 of the first photoelectric converter 101, respectively. An on-chip lens 131-4 is disposed on the second photoelectric converter 102.

The on-chip lenses 131-1 to 103-4 have the same shape and size. By forming the on-chip lens 131 as large as possible on the photoelectric converter, sensitivity can be improved. In the example illustrated in FIG. 5, the on-chip lens 131 has a quadrangular shape with rounded corners, and has a shape that is as large as possible on a quadrangular photoelectric converter.

In a case where the on-chip lenses 131 disposed on the first photoelectric converter 101 and the second photoelectric converter 102 have the same shape and size, it is easy to form the on-chip lenses 131 at a time of manufacturing, and it is possible to form the on-chip lenses without increasing the number of steps.

As described with reference to FIG. 5, three on-chip lenses 131 on the first photoelectric converter 101 having an L shape can be disposed.

Figure 6:
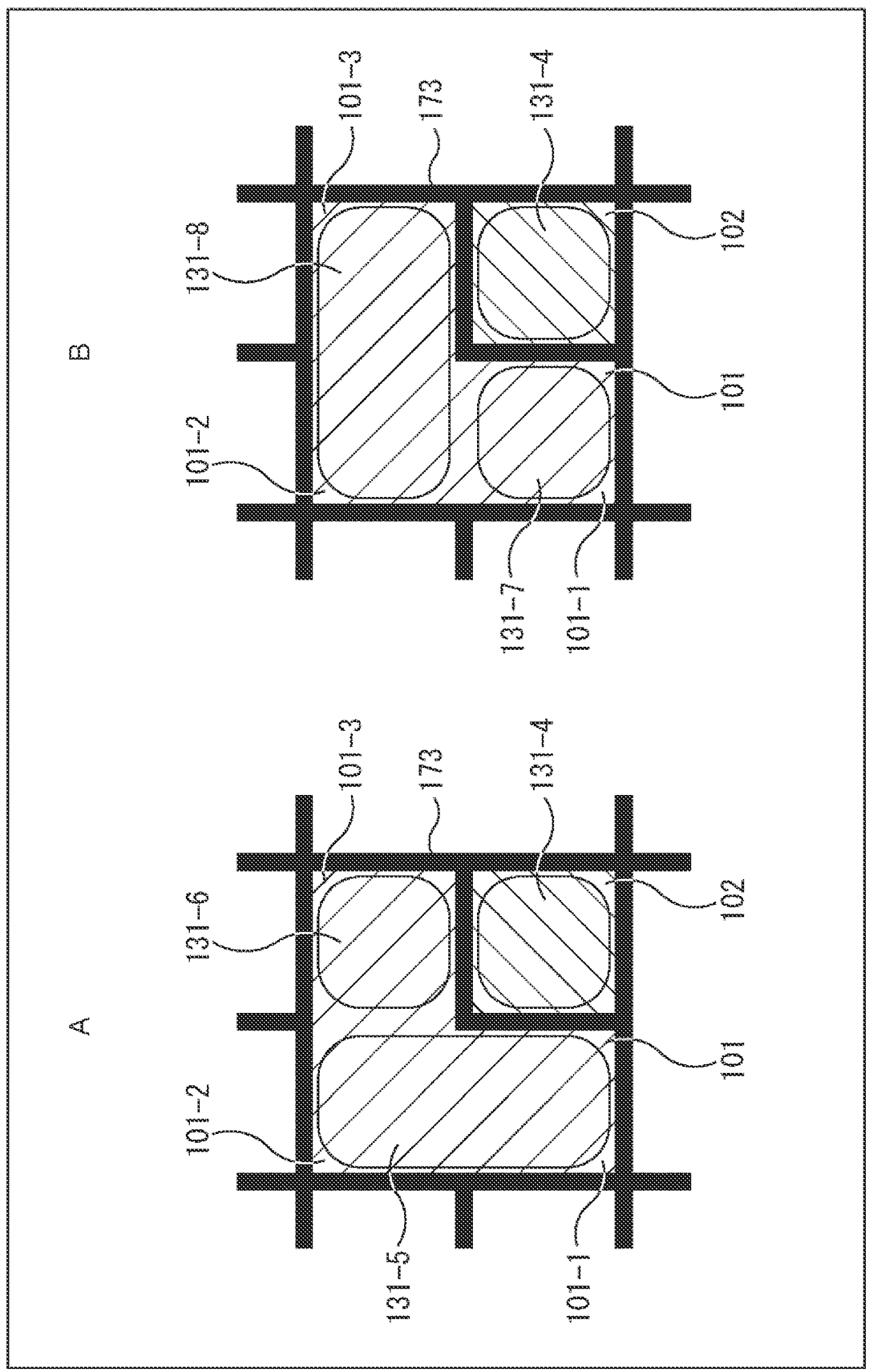
FIG. 6 is a diagram for describing another arrangement example of the on-chip lenses.

Referring to A of FIG. 6, an on-chip lens 131-5 and an on-chip lens 131-6 are disposed on the first photoelectric converter 101, and one on-chip lens 131-4 is disposed on the second photoelectric converter 102. In the example illustrated in FIG. 6, the on-chip lens 131-4 disposed on the second photoelectric converter 102 (small pixel) has the same shape and size as the on-chip lens 131-4 illustrated in FIG. 5.

The combined shape of the on-chip lens 131-5 and the on-chip lens 131-6 on the first photoelectric converter 101 has the same shape as the first photoelectric converter 101, that is, an L shape in this case.

The on-chip lens 131-5 has such a size and shape as to cover the first photoelectric converter 101-1 and the first photoelectric converter 101-2 disposed in a longitudinal direction in the drawing among the first photoelectric converters 101 having an L shape. The on-chip lens 131-6 has such a size and shape as to cover the first photoelectric converter 101-3 disposed on the upper right of the first photoelectric converter 101 having an L shape. The on-chip lens 131-6 has an equal size and shape to the size and shape of the on-chip lens 131-4.

Referring to B of FIG. 6, an on-chip lens 131-7 and an on-chip lens 131-8 are disposed on the first photoelectric converter 101, and one on-chip lens 131-4 is disposed on the second photoelectric converter 102.

The combined shape of the on-chip lens 131-7 and the on-chip lens 131-8 on the first photoelectric converter 101 has the same shape as the first photoelectric converter 101, that is, an L shape in this case.

The on-chip lens 131-7 has such a size and shape as to cover the first photoelectric converter 101-3 disposed on the lower left of the first photoelectric converter 101 having an L shape. The on-chip lens 131-7 has an equal size and shape to the size and shape of the on-chip lens 131-4. The on-chip lens 131-8 has such a size and shape as to cover the first photoelectric converter 101-2 and the first photoelectric converter 101-3 disposed in the horizontal direction in the drawing among the first photoelectric converters 101 having an L shape.

In a case where the two on-chip lenses 131 are disposed on the first photoelectric converter 101, a gap generated between the on-chip lenses 131 can be one place, for example, one place between the on-chip lens 131-5 and the on-chip lens 131-6 in the case of the example illustrated in A of FIG. 6. Therefore, a region where the on-chip lenses 131 are disposed can be enlarged, and sensitivity can be improved.

As described with reference to FIG. 6, two on-chip lenses 131 on the first photoelectric converter 101 having an L shape can be disposed.

Figure 7:
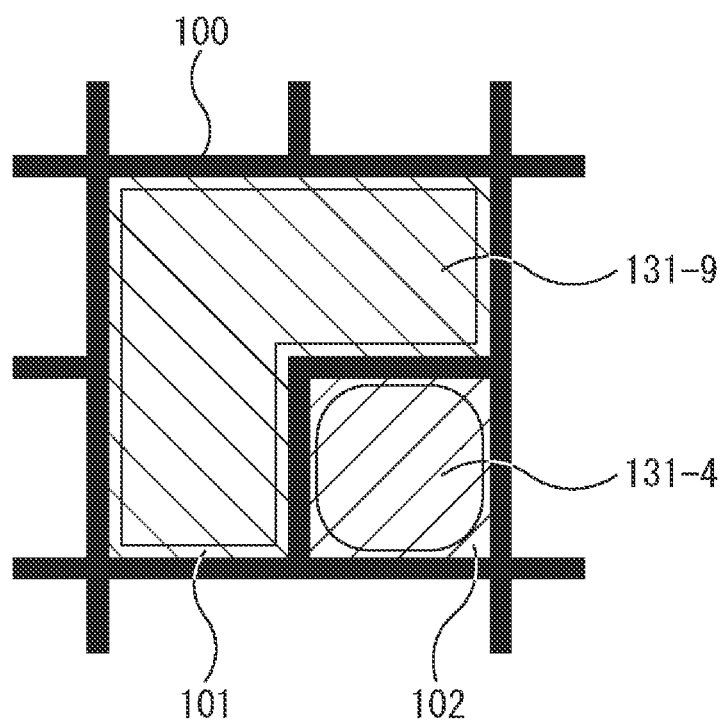
FIG. 7 is a diagram for describing still another arrangement example of the on-chip lenses.

Referring to FIG. 7, one on-chip lens 131-9 is disposed on the first photoelectric converter 101, and one on-chip lens 131-4 is disposed on the second photoelectric converter 102. In the example illustrated in FIG. 6, the on-chip lens 131-4 disposed on the second photoelectric converter 102 (small pixel) has the same shape and size as the on-chip lens 131-4 illustrated in FIG. 5.

The on-chip lens 131-9 on the first photoelectric converter 101 has the same shape as the first photoelectric converter 101, that is, an L shape in this case. The on-chip lens 131-5 is a lens formed in an L shape, and has a size about three times as large as the size of the on-chip lens 131-4.

In a case where one on-chip lens 131 is disposed on the first photoelectric converter 101, a gap generated between the on-chip lenses 131 can be eliminated. Therefore, a region where the on-chip lens 131 is disposed can be enlarged to the maximum, and sensitivity can be improved.

As described with reference to FIG. 7, one on-chip lens 131 on the first photoelectric converter 101 having an L shape can be disposed.

As illustrated in FIGS. 5 to 7, the present technology can be applied to a case where the number of the on-chip lenses 131 on the first photoelectric converter 101 is three, two, or one. Note that, although not illustrated, in a case where the size of the first photoelectric converter 101 is increased, the number of on-chip lenses 131 to be disposed can be increased in accordance with the size and shape, and a case where the number of on-chip lenses 131 is four or more is also in a range to which the present technology can be applied.

Shape of Slit in First Embodiment

In order to improve the sensitivity of the unit pixel 100, a slit is provided in the unit pixel 100. Embodiments such as a shape and an arrangement position of the slit will be described.

Figure 8:
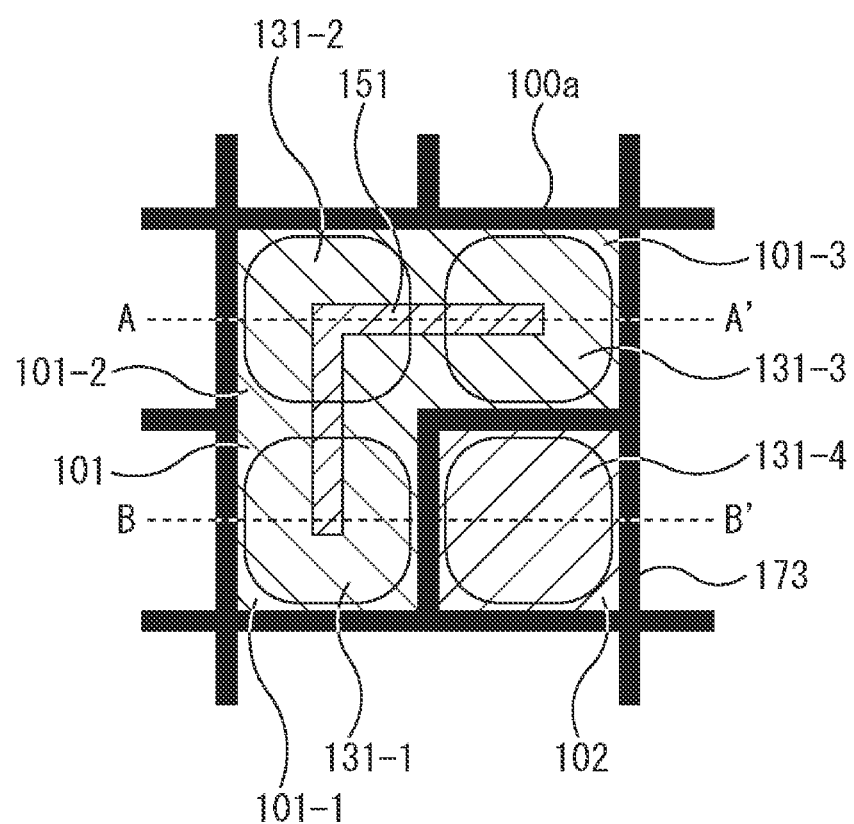
FIG. 8 is a diagram illustrating a planar configuration of a unit pixel according to a first embodiment.
Figure 9:
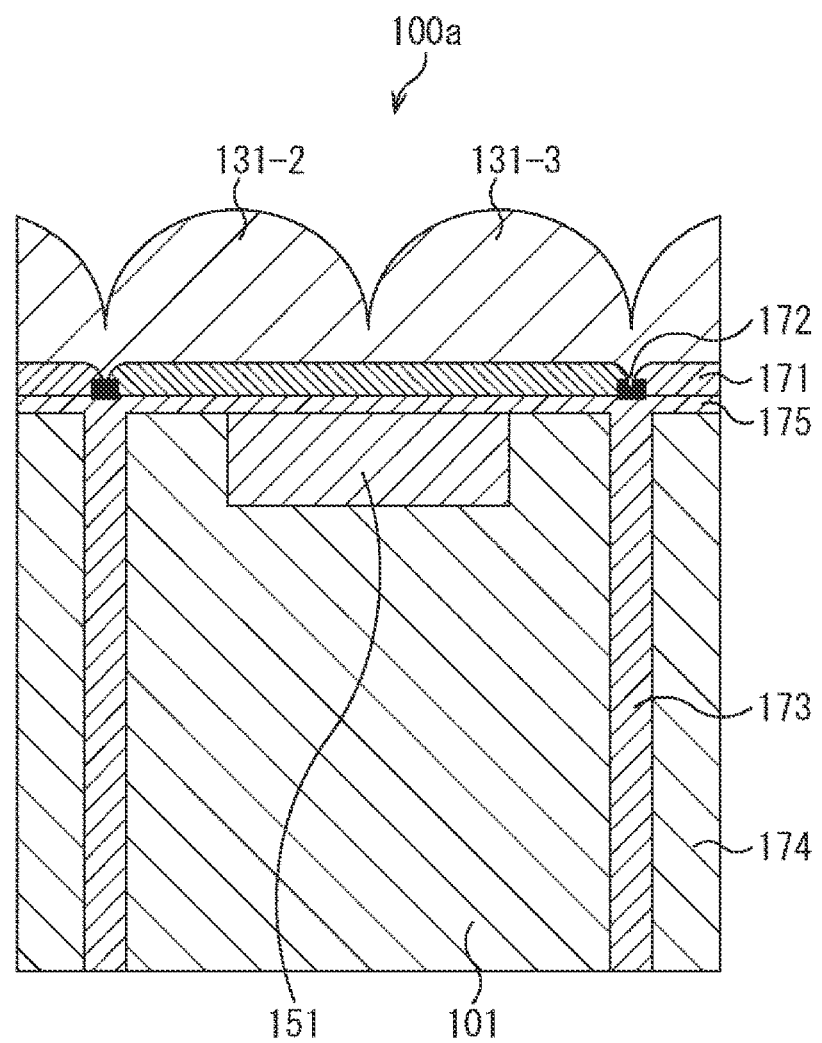
FIG. 9 is a diagram illustrating a sectional configuration of the unit pixel according to the first embodiment.
Figure 10:
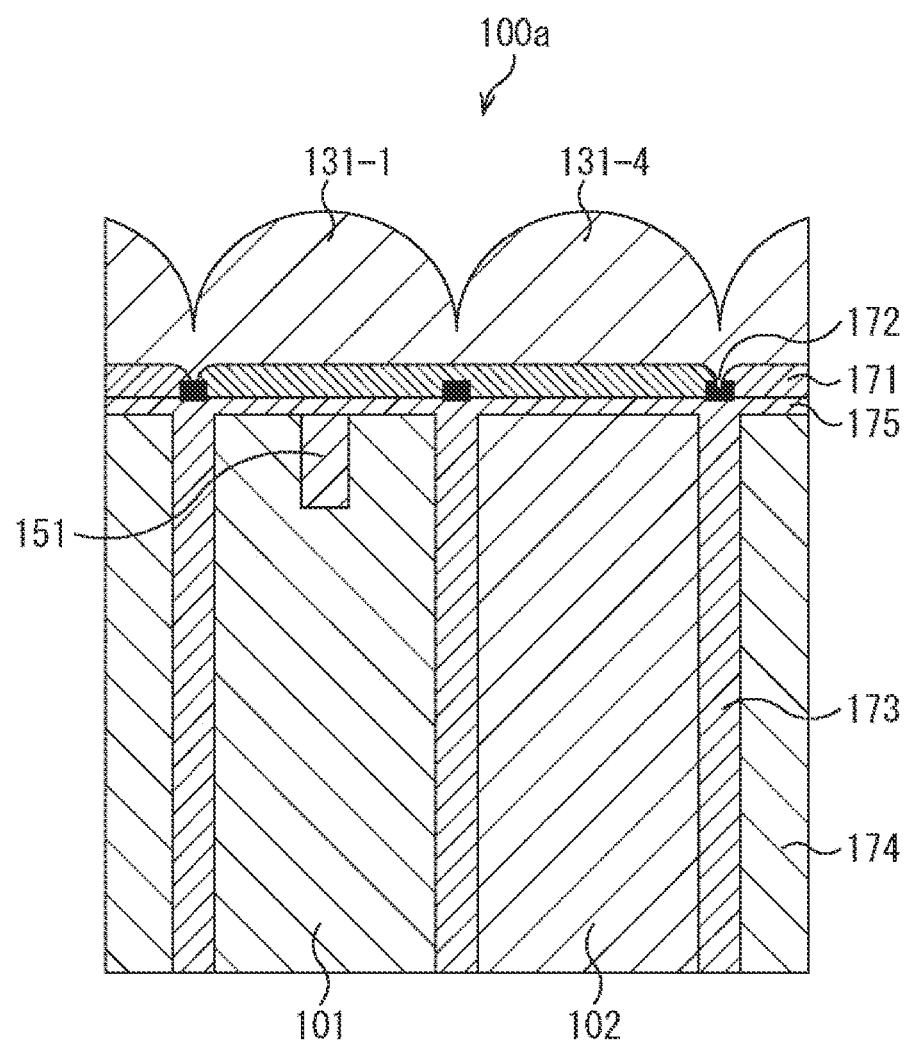
FIG. 10 is a diagram illustrating a sectional configuration of the unit pixel according to the first embodiment.

FIGS. 8 to 10 are diagrams for describing the shape and arrangement of a slit in a first embodiment. FIG. 8 is a plan view illustrating a configuration in a case where three on-chip lenses 131 are disposed on the first photoelectric converter 101 in the unit pixel 100 described with reference to FIG. 5 (in FIG. 7, a unit pixel 100*a*). FIG. 9 is a sectional view of the unit pixel 100*a* along a line segment A-A' in the plan view of FIG. 8. FIG. 10 is a sectional view of the unit pixel 100*a* along a line segment B-B' in the plan view of FIG. 8.

Referring to FIGS. 8 and 9, since the line segment A-A' is located in the first photoelectric converter 101-2 and the first photoelectric converter 101-3, the on-chip lens 131-2 and the on-chip lens 131-3 are provided. Referring to FIGS. 8 and 10, since the line segment B-B' is located in the first photoelectric converter 101-3 and the second photoelectric converter 102, the on-chip lens 131-1 and the on-chip lens 131-4 are provided.

A color filter layer 171 is formed below the on-chip lens 131-2 and the on-chip lens 131-3 (FIG. 9). Similarly, a color filter layer 171 is formed under the on-chip lens 131-1 and the on-chip lens 131-4 (FIG. 10). Since a basic configurations of the unit pixel 100*a* illustrated in FIGS. 9 and 10 are the same, the description will be given with reference to the sectional configuration example illustrated in FIG. 9, and if necessary, the sectional configuration example illustrated in FIG. 10 will also be referred to.

The color filter layer 171 can be, for example, a filter having colors of red (R), green (G), and blue (B). White (W) may be included. The color filter layer 171 may be omitted, for example, in a case where infrared light is received.

A light shielding film 172 is formed between the adjacent unit pixels 100*a* in the same layer as the color filter layer 171. The light shielding film 172 is a film provided so that light incident on the on-chip lens 131 of the unit pixel 100*a* does not enter the adjacent unit pixel 100*a*, and includes a material having a light shielding property.

The inter-pixel isolator 173 is formed in a region where the light shielding film 172 is formed. The inter-pixel isolator 173 is a film provided so that light incident on the first photoelectric converter 101 or the second photoelectric converter 102 of the unit pixel 100*a* does not leak into the adjacent unit pixel 100*a*. The inter-pixel isolator 173 is configured by a trench penetrating the silicon substrate 174. An oxide film of SiO2 or the like may be formed in the trench. A film including a material that reflects light, for example, a metal such as aluminum or tungsten, may be formed in the trench.

In a planar configuration example illustrated in FIG. 8, an L-shaped slit 151 is formed in the first photoelectric converter 101. The L-shaped slit 151 is formed in a central portion of the first photoelectric converter 101 having an L shape. The slit 151 is formed in a region where light is condensed by the L-shaped on-chip lens 131.

When viewed in the sectional view taken along the line segment A-A' illustrated in FIG. 9, the slit 151 is formed with a predetermined depth from near a center of the on-chip lens 131-2 to near a center of the on-chip lens 131-3. When viewed in the sectional view taken along the line segment B-B' illustrated in FIG. 10, the slit 151 having a predetermined thickness is formed with a predetermined depth near the center of the on-chip lens 131-3.

Note that, although the slit 151 is described here, the slit 151 may be referred to as a trench or a groove, and is formed as a trench that does not penetrate the silicon substrate 174. The inter-pixel isolator 173 is formed by a trench penetrating the silicon substrate 174, and the slit 151 is formed by a trench not penetrating the silicon substrate 174.

The slit 151 is formed with a predetermined depth from an interface of an oxide film 175 formed between the color filter layer 171 and the silicon substrate 174 toward the first photoelectric converter 101. The slit 151 is provided to scatter and reflect light incident on the first photoelectric converter 101 via the on-chip lens 131 and the color filter layer 171. This aspect is now described with reference to FIG. 11.

Figure 11:
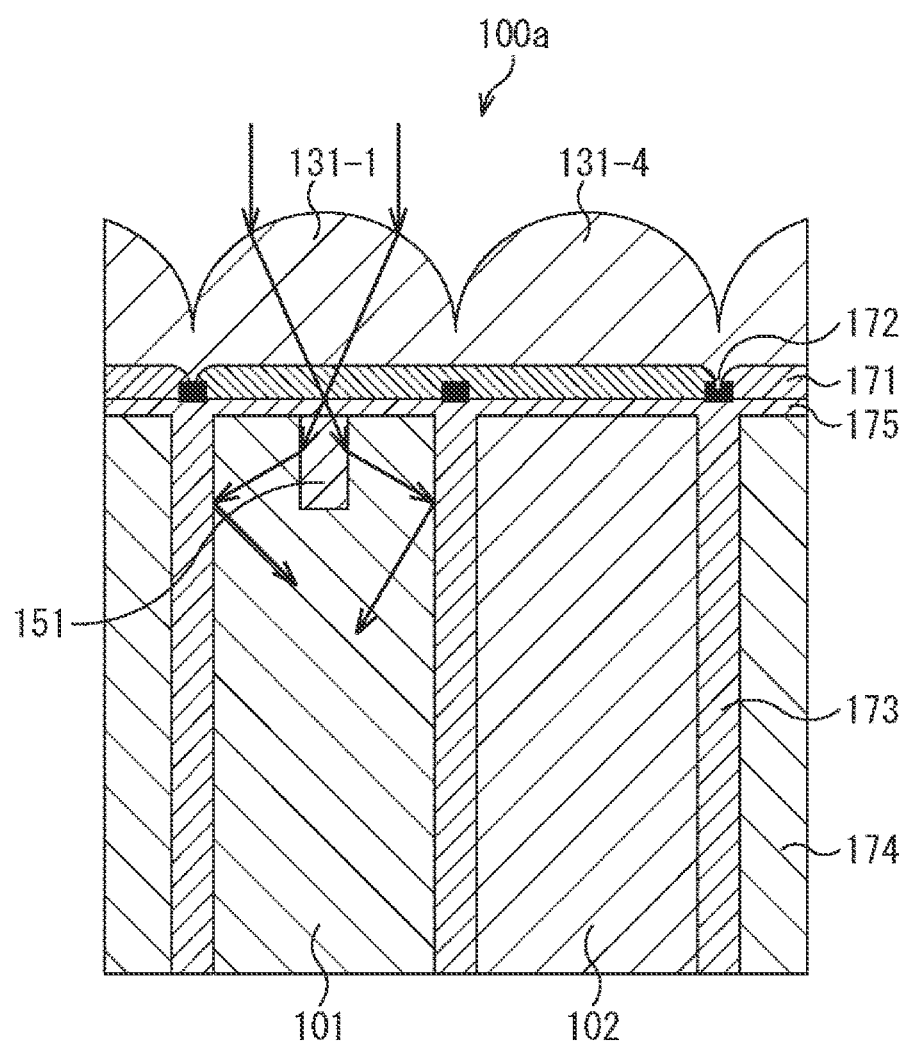
FIG. 11 is a diagram for describing scattering of light by a slit.

FIG. 11 is a sectional view illustrated in FIG. 10, and is a diagram in which traveling directions of light are indicated by arrows. A part of the light incident on the on-chip lens 131-1 is incident on the slit 151. Due to a difference in refractive index between the slit 151 and the silicon substrate 174, the light incident on the slit 151 is refracted and travels from the slit 151 into the silicon substrate 174, that is, into the first photoelectric converter 101. In other words, the incident light is scattered by the slit 151. The light scattered by the slit 151 reaches the inter-pixel isolator 173 and is reflected. In this way, by providing the slit 151, the incident light can be confined in the first photoelectric converter 101, and an optical path length can be extended.

The slit 151 may include a material that reflects light, for example, metal. For example, a metal film may be formed in a trench constituting the slit 151. In such a configuration, a part of the light incident on the on-chip lens 131-1 is reflected by the slit 151, reaches the inter-pixel isolator 173, and is reflected. In such a configuration, by providing the slit 151, the incident light can be also confined in the first photoelectric converter 101, and the optical path length can be extended.

As described above, the slit 151 can include metal or a material such as SiO2. The material filled in the trench constituting each of the slit 151 and the inter-pixel isolator 173 may be the same material, for example, SiO2, or may be different materials.

In this way, the unit pixel 100*a* can be formed such that the first photoelectric converter 101 having an L shape is provided with the slit 151 having the same shape as the first photoelectric converter 101, in this case, an L shape. By providing the slit 151 in the first photoelectric converter 101, the sensitivity of the first photoelectric converter 101 can be improved.

Second Embodiment

Figure 12:
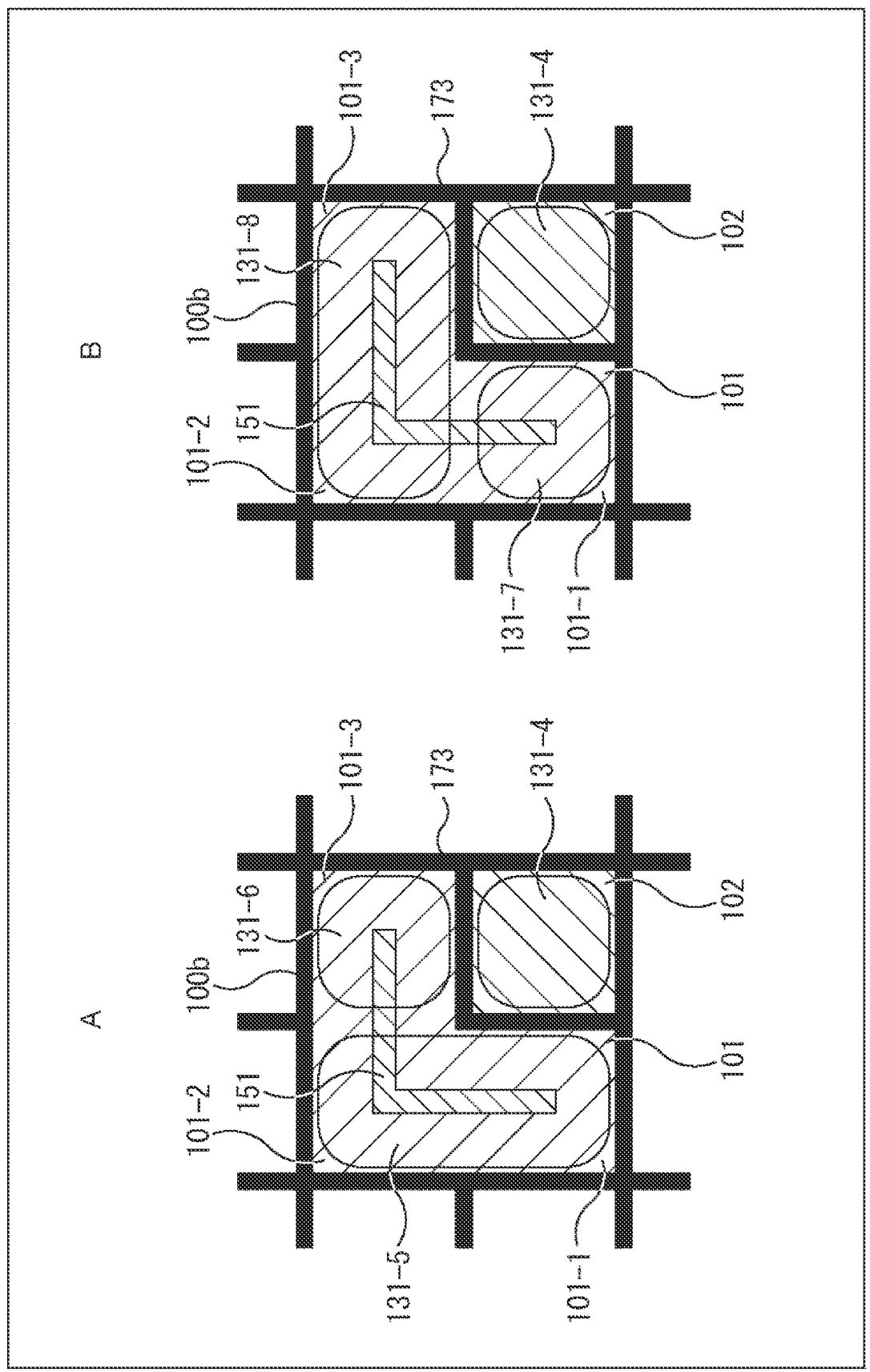
FIG. 12 is a diagram illustrating a planar configuration of a unit pixel according to a second embodiment.

FIG. 12 is a diagram illustrating a configuration of a unit pixel 100*b* according to a second embodiment. The unit pixel 100*b* illustrated in FIG. 12 has a configuration in which two on-chip lenses 131 are disposed on the first photoelectric converter 101 described with reference to FIG. 6, and is a plan view illustrating a configuration of the unit pixel 100*b* provided with the slit 151.

In the unit pixel 100*b* illustrated in A of FIG. 12, the on-chip lens 131-5 and the on-chip lens 131-6 are disposed on the first photoelectric converter 101, and the slit 151 having an L shape is provided under the two on-chip lenses 131.

In the unit pixel 100*b* illustrated in B of FIG. 12, the on-chip lens 131-7 and the on-chip lens 131-8 are disposed on the first photoelectric converter 101, and the slit 151 having an L shape is provided under the two on-chip lenses 131.

The shape, size, and the like of the slit 151 illustrated in A of FIG. 12 and B of FIG. 12 are the same as the shape, size, and the like of the slit 151 provided in the unit pixel 100*a* according to the first embodiment.

The L-shaped slit 151 can be provided regardless of the shape and arrangement of the on-chip lens 131, and the sensitivity can be improved by providing the slit 151.

Third Embodiment

Figure 13:
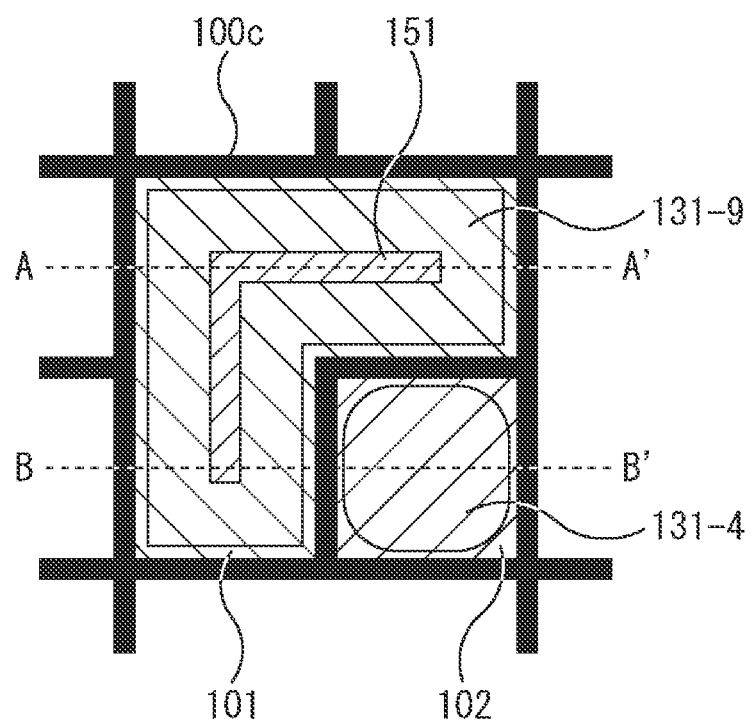
FIG. 13 is a diagram illustrating a planar configuration of a unit pixel according to a third embodiment.
Figure 14:
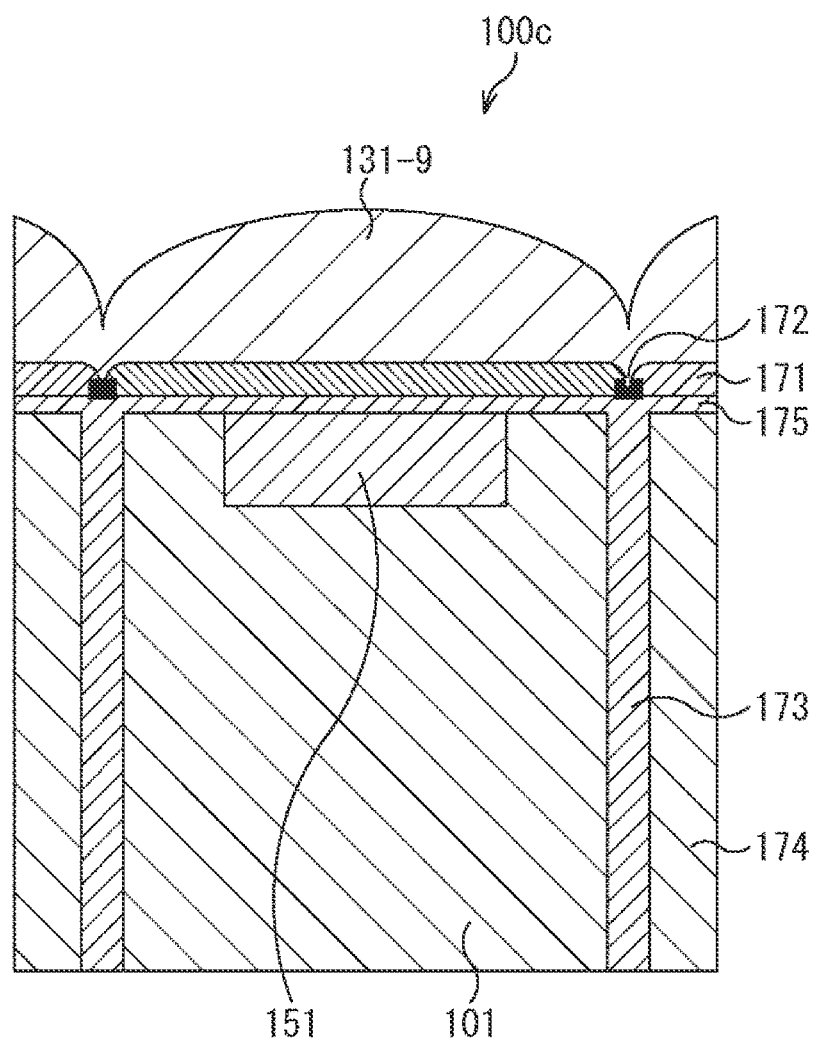
FIG. 14 is a diagram illustrating a sectional configuration of the unit pixel according to the third embodiment.

FIGS. 13 and 14 are diagrams illustrating a configuration of a unit pixel 100*c* according to a third embodiment. The unit pixel 100*c* illustrated in FIG. 13 has a configuration in which one on-chip lenses 131 are disposed on the first photoelectric converter 101 described with reference to FIG. 7, and is a plan view illustrating a configuration of the unit pixel 100*c* provided with the slit 151.

In the unit pixel 100*c* illustrated in FIG. 13, the on-chip lens 131-9 is disposed on the first photoelectric converter 101, and the slit 151 having an L shape is provided under the on-chip lenses 131-9.

The shape, size, and the like of the slit 151 illustrated in FIG. 13 are the same as the shape, size, and the like of the slit 151 provided in the unit pixel 100*a* according to the first embodiment.

FIG. 14 is a sectional view of the unit pixel 100*c* along a line segment A-A' in the plan view of FIG. 13. Since a basic configuration is similar to the basic configuration of the unit pixel 100*a* illustrated in FIGS. 9 and 10, the same components are denoted by the same reference signs, and will not be described accordingly. The sectional view of the unit pixel 100*c* taken along a line segment B-B' in the plan view of FIG. 13 is similar to the sectional view of the unit pixel 100*a* illustrated in FIG. 10, and thus will be not be described.

Referring to FIG. 14, the on-chip lens 131-9 is disposed on the line segment A-A'. In a case where the on-chip lens 131-9 is divided into four equal parts, the slit 151 is formed in a portion corresponding to two regions located at the center.

The L-shaped slit 151 can be provided regardless of the shape and arrangement of the on-chip lens 131, and the sensitivity can be improved by providing the slit 151.

Fourth Embodiment

Figure 15:
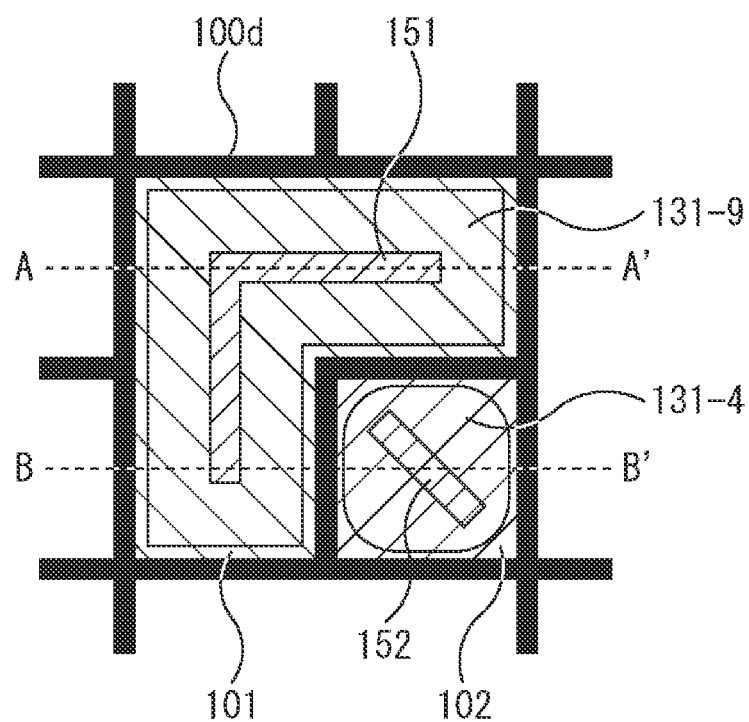
FIG. 15 is a diagram illustrating a planar configuration of a unit pixel according to a fourth embodiment.
Figure 16:
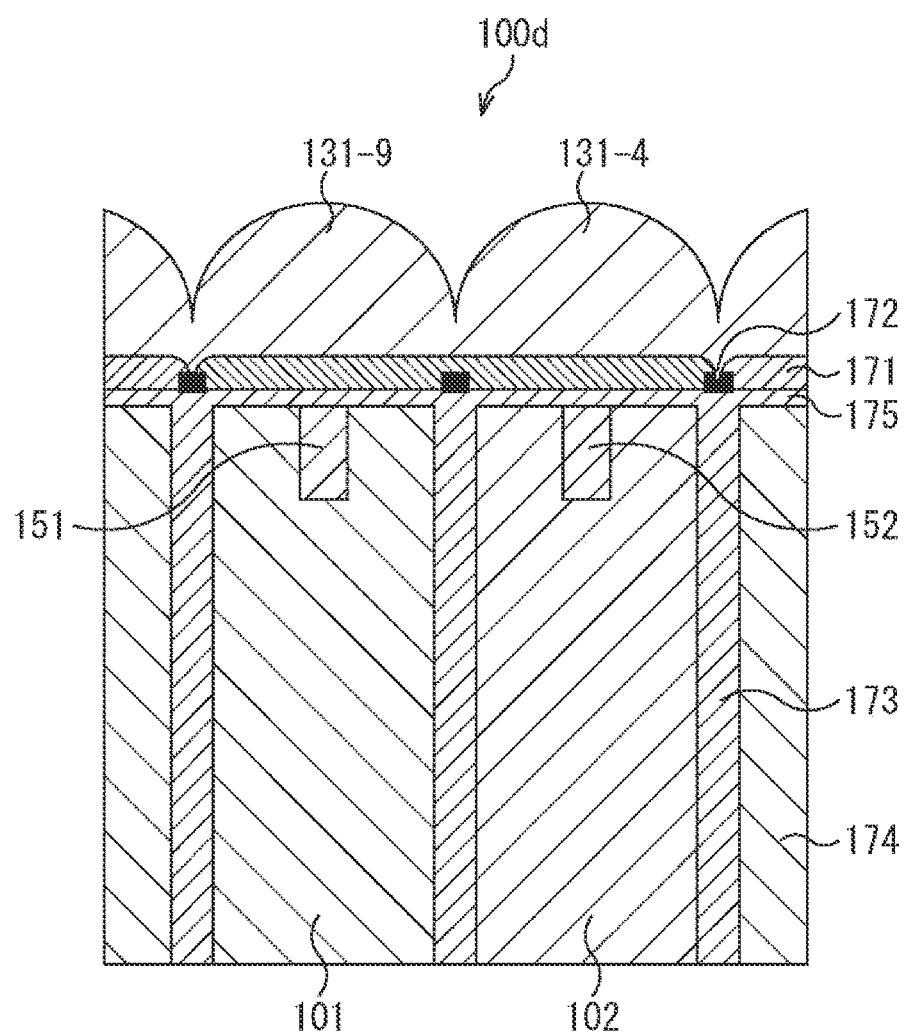
FIG. 16 is a diagram illustrating a sectional configuration of the unit pixel according to the fourth embodiment.

FIGS. 15 and 16 are diagrams illustrating a configuration of a unit pixel 100*d* according to a fourth embodiment. The unit pixel 100*d* illustrated in FIG. 15 has a configuration in which one on-chip lens 131 is disposed on the first photoelectric converter 101 described with reference to FIG. 7, is provided with the slit 151, and is a plan view illustrating a configuration of the unit pixel 100*d* in which a slit 152 is also provided in the second photoelectric converter 102 which is a small pixel.

In the unit pixel 100*d* illustrated in FIG. 15, the on-chip lens 131-9 is disposed on the first photoelectric converter 101, and the slit 151 having an L shape is provided under the on-chip lenses 131-9. This configuration is similar to the configuration of the unit pixel 100*c* (FIG. 13) according to the third embodiment.

In the unit pixel 100*d* illustrated in FIG. 15, the on-chip lens 131-4 is disposed on the second photoelectric converter 102, and a slit 152 having a quadrangular shape in plan view and a rectangular shape in the example illustrated in FIG. 15 is provided under the on-chip lens 131-4. The slit 152 is formed in an oblique direction of the second photoelectric converter 102 in the drawing. Although details will be described later, formation in an oblique direction can prevent light scattered by the slit 152 in the second photoelectric converter 102 from advancing toward the first photoelectric converter 101 and entering the first photoelectric converter 101.

FIG. 16 is a sectional view of the unit pixel 100d along a line segment B-B' n the plan view of FIG. 15. Since a basic configuration is similar to the basic configuration of the unit pixel 100a illustrated in FIGS. 9 and 10, the same components are denoted by the same reference signs, and will not be described accordingly. The sectional view of the unit pixel 100d taken along a line segment A-A' in the plan view of FIG. 15 is similar to the sectional view of the unit pixel 100c illustrated in FIG. 14, and thus will be not be described.

Referring to FIG. 16, the on-chip lens 131-9 and the on-chip lens 131-4 are disposed on the line segment B-B'. The slit 151 is formed near the center of the first photoelectric converter 101 below the on-chip lens 131-9. The slit 152 is formed near the center of the second photoelectric converter 102 below the on-chip lens 131-4.

In this way, the slit 152 may also be provided in the second photoelectric converter 102. By providing the slit 152 in the second photoelectric converter 102, the sensitivity of the second photoelectric converter 102 can be also improved.

FIG. 15 illustrates an example in which an embodiment in which the slit 152 is also provided in the second photoelectric converter 102 is applied to the unit pixel 100c according to the third embodiment. However, the example can be also applied to the unit pixel 100a (FIG. 8) according to the first embodiment and the unit pixel 100b (FIG. 12) according to the second embodiment.

Fifth Embodiment

Figure 17:
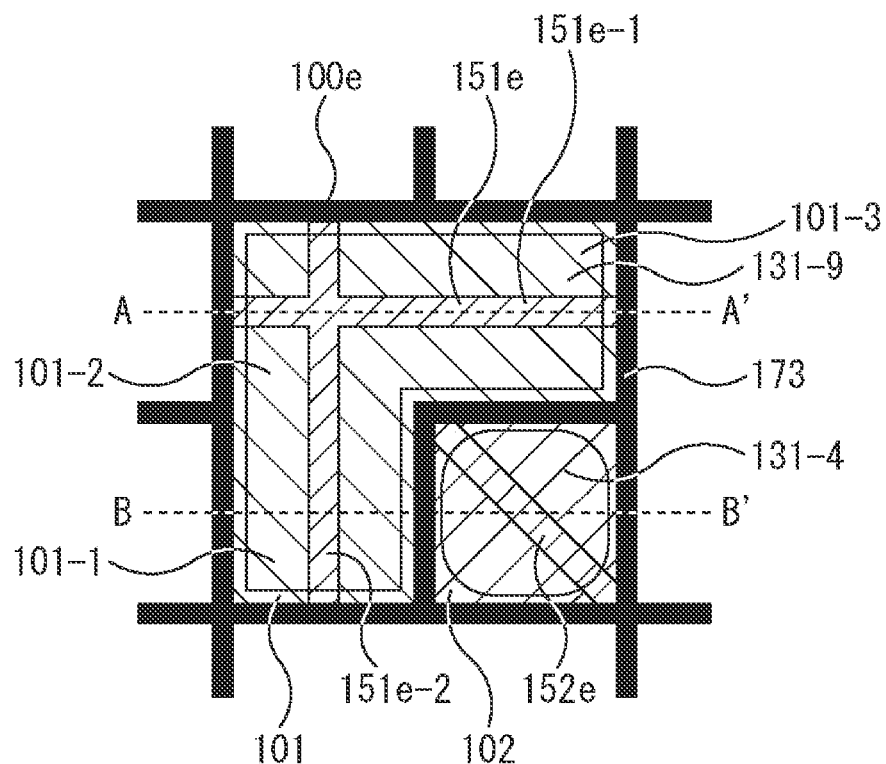
FIG. 17 is a diagram illustrating a planar configuration of a unit pixel according to a fifth embodiment.
Figure 18:
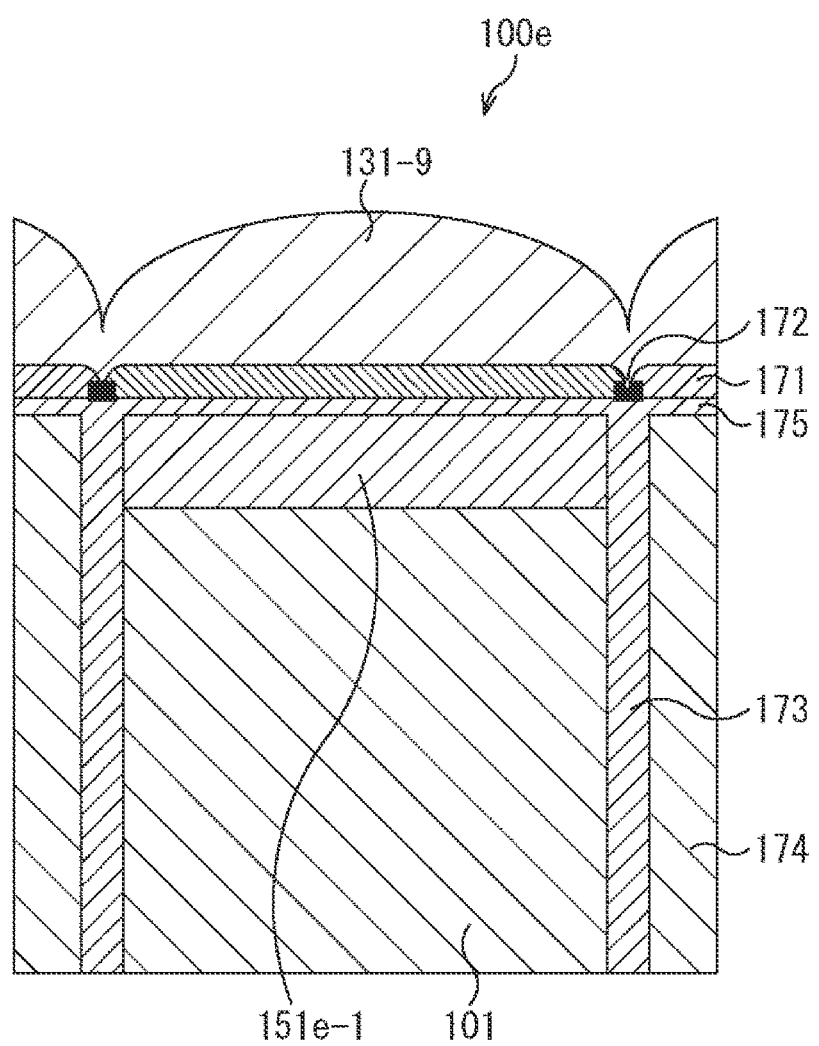
FIG. 18 is a diagram illustrating a sectional configuration of the unit pixel according to the fifth embodiment.
Figure 19:
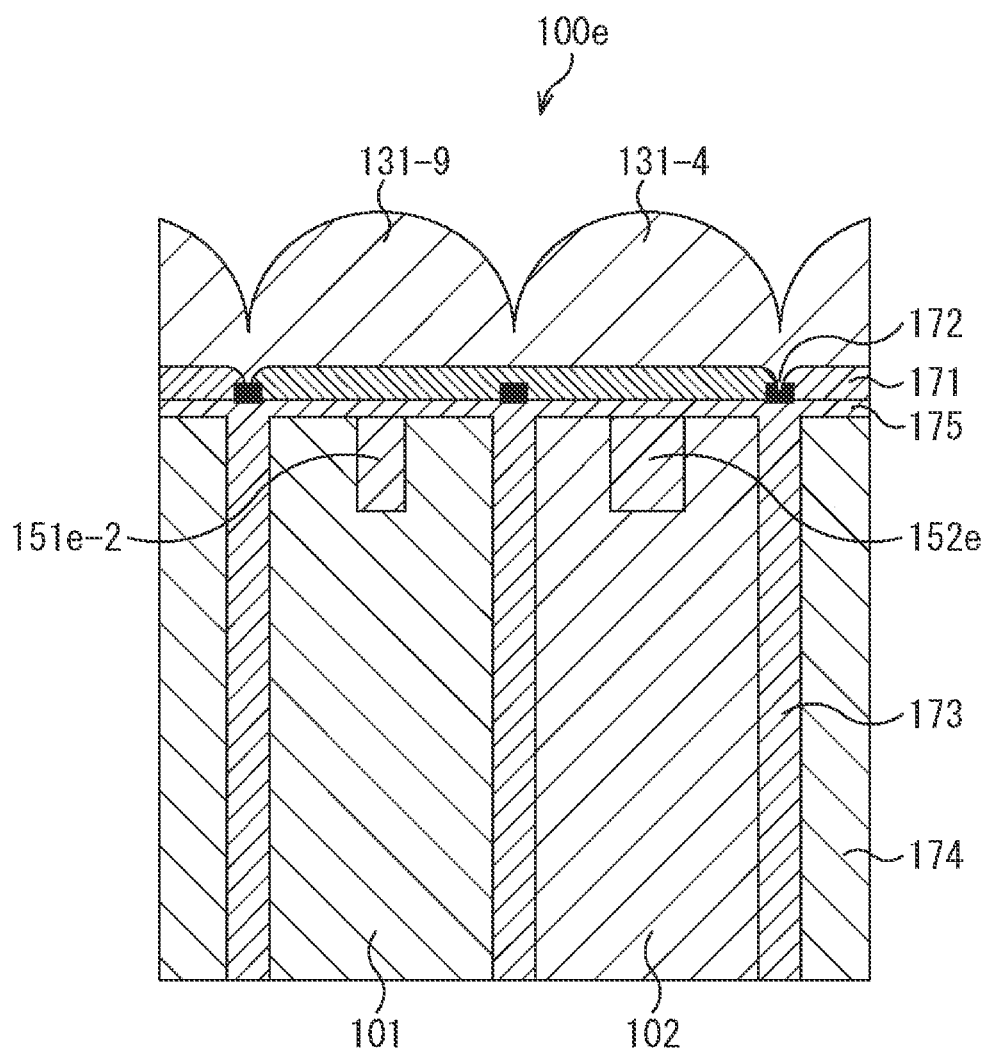
FIG. 19 is a diagram illustrating a sectional configuration of the unit pixel according to the fifth embodiment.

FIGS. 17 to 19 are diagrams illustrating a configuration of a unit pixel 100e according to a fifth embodiment. In the unit pixel 100e illustrated in FIG. 17, a case will be described as an example where the fifth embodiment is applied to a configuration in which one on-chip lens 131-9 is disposed on the first photoelectric converter 101 described with reference to FIG. 7.

In the unit pixel 100e illustrated in FIGS. 17 to 19, the slit 151e and the slit 152e have different shapes from, for example, the slit 151 and the slit 152 of the unit pixel 100d illustrated in FIG. 15, and are similar to the slit 151 and the slit 152 in terms of the other points.

The slit 151e formed in the first photoelectric converter 101 of the unit pixel 100e is formed so as to be in contact with the inter-pixel isolator 173. The slit 151e includes a slit 151e-1 provided in the lateral direction in the drawing and a slit 151e-2 provided in the longitudinal direction in the drawing.

The slit 151e-1 is formed in a quadrangular shape (a rectangle in FIG. 17) from the inter-pixel isolator 173 on the left side in the drawing to the inter-pixel isolator 173 on the right side in the drawing in the region of the first photoelectric converter 101-2 and the first photoelectric converter 101-3. The slit 151e-2 is formed in a quadrangular shape (a rectangle in FIG. 17) from the inter-pixel isolator 173 on the lower side in the drawing to the inter-pixel isolator 173 on the upper side in the drawing in the region of the first photoelectric converter 101-1 and the first photoelectric converter 101-2.

The slit 151e-1 and the slit 151e-2 are disposed at positions intersecting with each other at the center of the first photoelectric converter 101-2.

The slit 152e is formed in a quadrangular shape (a rectangle in FIG. 17) in the region of the second photoelectric converter 102 from a corner of the inter-pixel isolator 173 on the upper left side in the drawing to a corner of the inter-pixel isolator 173 on the lower right side in the drawing.

Referring to the sectional view taken along a line segment A-A' illustrated in FIG. 18, the slit 151e-1 is formed from the inter-pixel isolator 173 on the left side in the drawing to the inter-pixel isolator 173 on the right side in the drawing under the on-chip lens 131-9.

Referring to the sectional view taken along a line segment B-B' illustrated in FIG. 19, the slit 151e-2 is formed in the first photoelectric converter 101 near the center below the on-chip lens 131-9, and the slit 152e is formed in the second photoelectric converter 102 near the center below the on-chip lens 131-4.

In this way, in a case where the slit 151e is configured to be in contact with the inter-pixel isolator 173, the slit 151e and the inter-pixel isolator 173 may be integrated. For example, the slit 151e and the inter-pixel isolator 173 can include the same material, for example, SiO2. Of course, the slit 151e and the inter-pixel isolator 173 can include different materials. For example, the slit 151e can include SiO2, and the inter-pixel isolator 173 can include metal (a metal film can be formed in the inter-pixel isolator 173).

In this way, the shape of the slit 151e may be a shape obtained by extending each side of an L shape. By providing the slit 151e having such a shape in the first photoelectric converter 101, the sensitivity of the first photoelectric converter 101 can be improved. In addition, by providing the slit 152e having such a shape in the second photoelectric converter 102, the sensitivity of the second photoelectric converter 102 can be improved.

FIG. 17 illustrates an example in which the fifth embodiment is applied to the unit pixel 100d according to the fourth embodiment. However, the fifth embodiment can be applied to the unit pixel 100a (FIG. 8) according to the first embodiment, the unit pixel 100b (FIG. 12) according to the second embodiment, and the unit pixel 100c (FIG. 13) according to the third embodiment, and the slit 151 provided in the first photoelectric converter 101 can have a shape in which each side of an L shape is extended.

Sixth Embodiment

Figure 20:
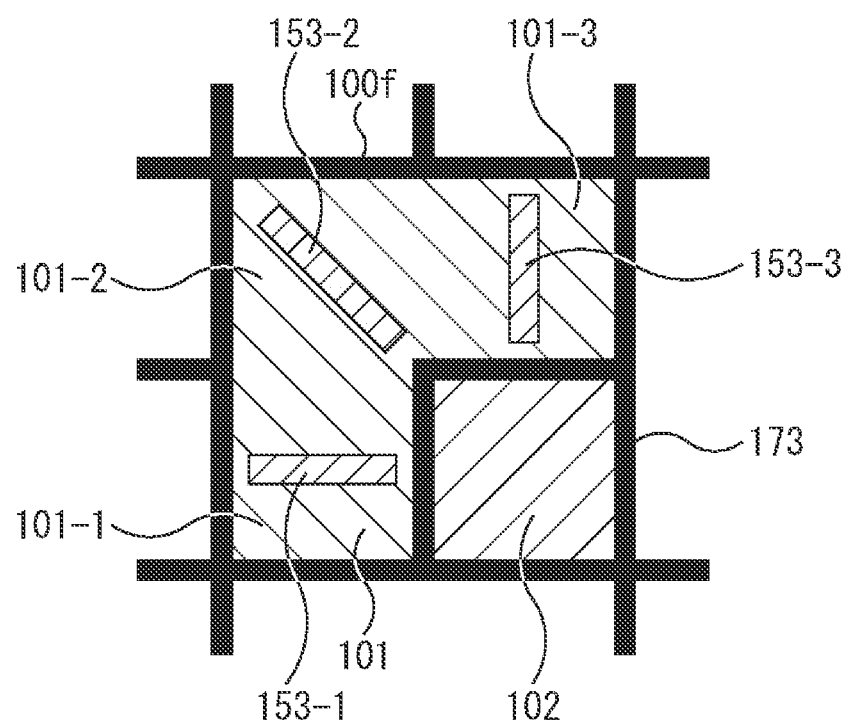
FIG. 20 is a diagram illustrating a planar configuration of a unit pixel according to a sixth embodiment.

FIG. 20 is a diagram illustrating a configuration of a unit pixel 100f according to a sixth embodiment. In the embodiment described below, unless otherwise specified, the description will be continued assuming that the embodiment can be applied to the configuration in which three on-chip lenses 131 are provided on the first photoelectric converter 101 illustrated in FIG. 5, the configuration in which two on-chip lenses 131 are provided on the first photoelectric converter 101 illustrated in FIG. 6, and the configuration in which one on-chip lens 131 is provided on the first photoelectric converter 101 illustrated in FIG. 7.

In the unit pixel 100f illustrated in FIG. 20, three slits of a slit 153-1, a slit 153-2, and a slit 153-3 are formed in the first photoelectric converter 101. The slit 153-1 is formed in a quadrangular shape in the lateral direction in the drawing in the region of the first photoelectric converter 101-1. The slit 153-2 is formed in a quadrangular shape in an oblique direction in the drawing in the region of the first photoelectric converter 101-2. The slit 153-3 is formed in a quadrangular shape in the longitudinal direction in the drawing in the region of the first photoelectric converter 101-3.

Although details will be described later, each of the slits 153-1 to 153-3 is formed in such a position, direction, and shape that light travels in such a direction as to be confined in the first photoelectric converter 101. Each of the slits 153-1 to 153-3 is formed in such a position, direction, and shape that light does not travel toward the second photoelectric converter 102.

Each of the slits 153-1 to 153-3 is formed at a position where light incident by the on-chip lens 131 is condensed. For example, in a case where the configuration in which three on-chip lenses 131 are on the first photoelectric converter 101 illustrated in FIG. 5 is applied to the sixth embodiment, for example, the slit 153-1 provided in the region of the on-chip lens 131-1 is formed in a region where light is condensed by the on-chip lens 131-1, that is, near the center of the first photoelectric converter 101-1.

All of the slits 153-1 to 153-3 may be formed with the same depth, or different depths. In a case where the slits 153-1 to 153-3 are formed with different depths, for example, the slit 153-2 may be deeper than the slits 153-1 and 153-3. In such a case, for example, out of the light scattered by the slit 153-1, the light traveling toward the slit 153-2 may be scattered again at the slit 153-2.

In this way, in a case where the plurality of slits 153 is provided in the first photoelectric converter 101, the sensitivity of the first photoelectric converter 101 can be also improved.

Seventh Embodiment

Figure 21:
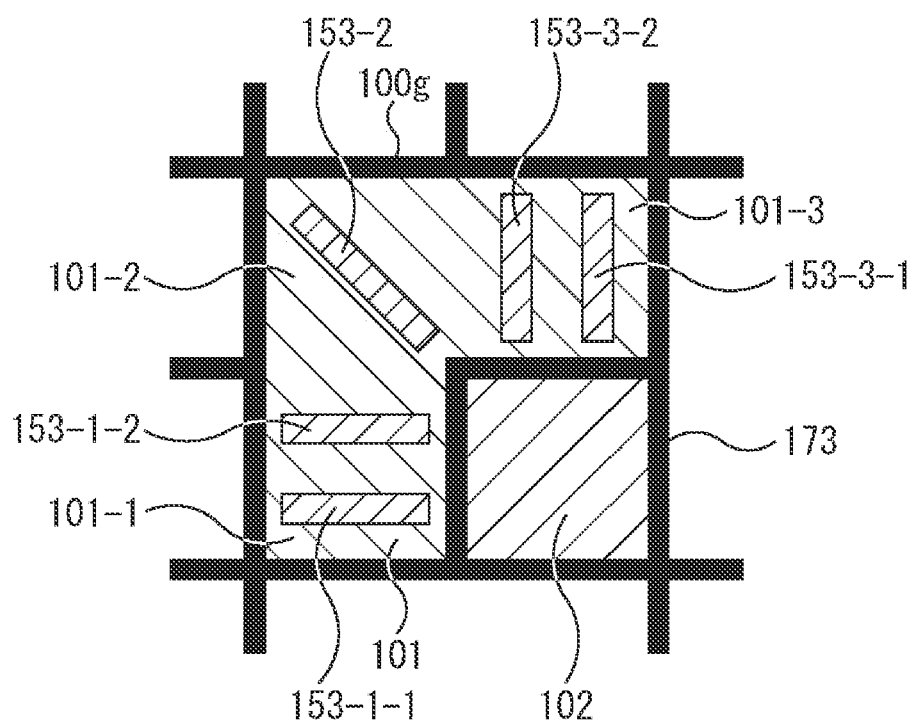
FIG. 21 is a diagram illustrating a planar configuration of a unit pixel according to a seventh embodiment.

FIG. 21 is a diagram illustrating a configuration of a unit pixel 100g according to a seventh embodiment.

The unit pixel 100g illustrated in FIG. 21 is different from the unit pixel 100f (FIG. 20) according to the sixth embodiment in that the unit pixel 100g includes two slits 153-1-1 and 153-1-2 in the region of the first photoelectric converter 101-1 and two slits 153-3-1 and 153-3-2 in the region of the first photoelectric converter 101-3, and is similar to the unit pixel 100f in terms of the other points.

In the first photoelectric converter 101-1, the quadrangular slits 153-1-1 and 153-1-2 having a long side in the lateral direction in the drawing are disposed at positions parallel to each other. The first photoelectric converter 101-2 is provided with one quadrangular slit 153-2 having a long side in an oblique direction in the drawing. In the first photoelectric converter 101-3, the quadrangular slits 153-3-1 and 153-3-2 having a long side in the longitudinal direction in the drawing are disposed at positions parallel to each other.

As in the first photoelectric converter 101-1 and the first photoelectric converter 101-3, a plurality of slits 153 may be provided in a predetermined region.

Note that, although, in the example illustrated in FIG. 21, an example has been illustrated in which the two slits 153 are formed in a region of a predetermined size of the first photoelectric converter 101, three or more slits 153 may formed.

Note that a plurality of slits 153-2 disposed in the first photoelectric converter 101-2 may be also disposed in the first photoelectric converter 101-2. For example, two slits 153-2 disposed in an oblique direction may be formed in the first photoelectric converter 101-2.

Note that, in a case where the plurality of slits 153 is provided in one predetermined region of the first photoelectric converter 101, the lengths of the plurality of slits 153 may be the same or different. For example, the slit 153-1-1 and the slit 153-1-2 disposed in the first photoelectric converter 101-1 may have the same length or different lengths. The slits 153 may be formed with the same depth or different depths.

In this way, in a case where the plurality of slits 153 is provided in the first photoelectric converter 101, the sensitivity of the first photoelectric converter 101 can be also improved.

Eighth Embodiment

Figure 22:
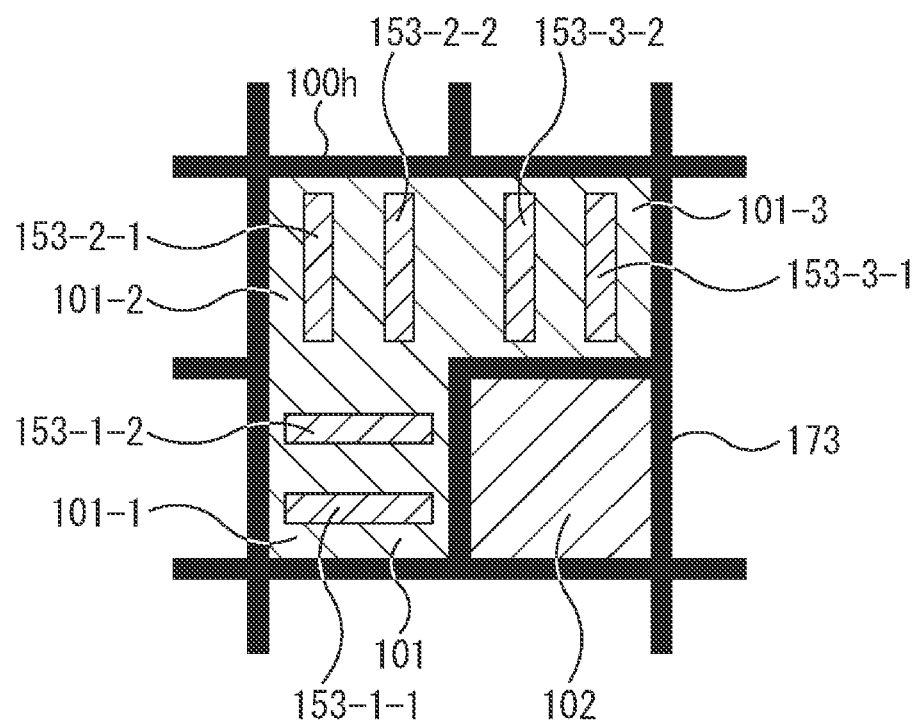
FIG. 22 is a diagram illustrating a planar configuration of a unit pixel according to an eighth embodiment.

FIG. 22 is a diagram illustrating a configuration of a unit pixel 100h according to an eighth embodiment.

The unit pixel 100h illustrated in FIG. 22 is different from the unit pixel 100g (FIG. 21) according to the seventh embodiment in that the unit pixel 100h includes two slits 153-2-1 and a slit 153-2-2 in the region of the first photoelectric converter 101-2, and similar to the unit pixel 100g in terms of the other points.

In the first photoelectric converter 101-2, the quadrangular slits 153-2-1 and 153-2-2 having a long side in the longitudinal direction in the drawing are disposed at positions parallel to each other with an equal length.

As illustrated in FIG. 22, a plurality of slits 153 provided in the first photoelectric converter 101-2 may be provided in the longitudinal direction. Note that, although, in the example illustrated in FIG. 22, an example has been illustrated in which the two slits 153 are formed in a region of a predetermined size of the first photoelectric converter 101, three or more slits 153 may formed.

In a case where the plurality of slits 153 is provided in one predetermined region of the first photoelectric converter 101, the lengths of the plurality of slits 153 may be the same or different.

In this way, in a case where the plurality of slits 153 is provided in the first photoelectric converter 101, the sensitivity of the first photoelectric converter 101 can be also improved.

Ninth Embodiment

Figure 23:
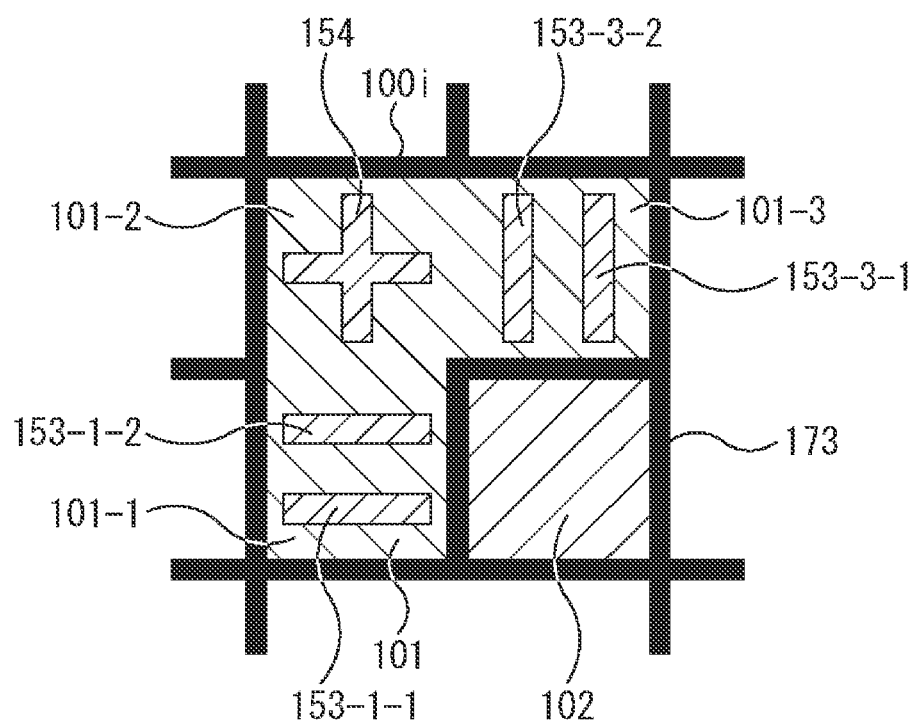
FIG. 23 is a diagram illustrating a planar configuration of a unit pixel according to a ninth embodiment.

FIG. 23 is a diagram illustrating a configuration of a unit pixel 100i according to a ninth embodiment.

The unit pixel 100i illustrated in FIG. 23 is different from the unit pixel 100g (FIG. 21) according to the seventh embodiment in that the unit pixel 100i includes a cross-shaped slit 154 in the region of the first photoelectric converter 101-2, and similar to the unit pixel 100g in terms of the other points.

In the first photoelectric converter 101-2, the cross-shaped slit 154 is disposed near the center of the first photoelectric converter 101-2. Note that the cross-shaped slit 154 illustrated in FIG. 23 is formed such that a longitudinal long side and a lateral long side have an equal length, but may have a shape in which one of the longitudinal long side or the lateral long side is longer.

Note that the cross-shaped slit 154 may be disposed in both or either the first photoelectric converter 101-1 or the first photoelectric converter 101-3. That is, a plurality of cross-shaped slits 154 may be disposed in the first photoelectric converter 101.

In this way, in a case where the plurality of slits 153 or 154 is provided in the first photoelectric converter 101, the sensitivity of the first photoelectric converter 101 can be also improved.

Tenth Embodiment

Figure 24:
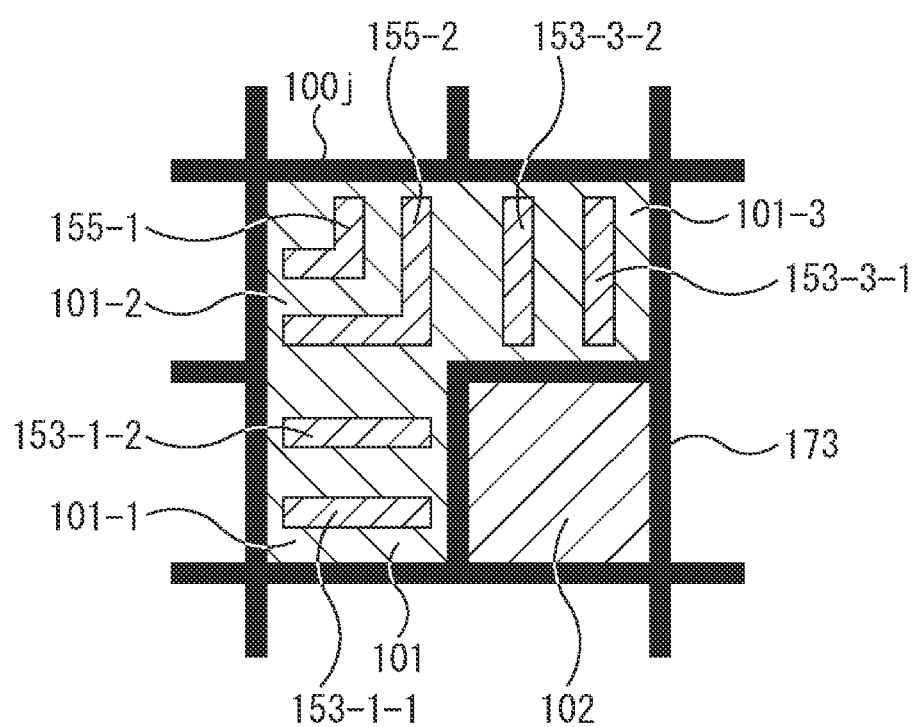
FIG. 24 is a diagram illustrating a planar configuration of a unit pixel according to a tenth embodiment.

FIG. 24 is a diagram illustrating a configuration of a unit pixel 100*j* according to a tenth embodiment.

The unit pixel 100*j* illustrated in FIG. 24 is different from the unit pixel 100*g* (FIG. 21) according to the seventh embodiment in that an L-shaped slit 155 is provided in the region of the first photoelectric converter 101-2, and is similar to the unit pixel 100*g* in terms of the other points.

In the first photoelectric converter 101-2, a slit 155-1 and a slit 155-2 having an L shape are disposed. The slit 155-1 is formed on the side close to the inter-pixel isolator 173 and has a shape smaller than the slit 155-2. Note that the L-shaped slit 155 illustrated in FIG. 24 is formed such that a longitudinal long side and a lateral long side have an equal length, but may have a shape in which one of the longitudinal long side or the lateral long side is longer.

Note that the L-shaped slit 155 may be disposed in both or either the first photoelectric converter 101-1 or the first photoelectric converter 101-3. That is, a plurality of L-shaped slits 155 may be disposed in the first photoelectric converter 101.

In this way, in a case where the plurality of slits 153 or 155 is provided in the first photoelectric converter 101, the sensitivity of the first photoelectric converter 101 can be also improved.

Eleventh Embodiment

Figure 25:
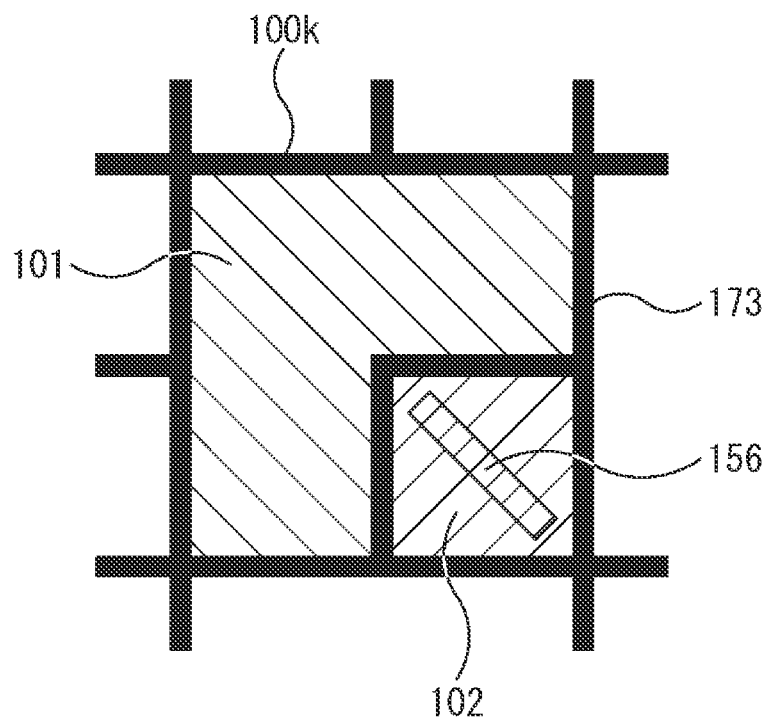
FIG. 25 is a diagram illustrating a planar configuration of a unit pixel according to an eleventh embodiment.

FIG. 25 is a diagram illustrating a configuration of a unit pixel 100*k* according to an eleventh embodiment.

The unit pixel 100*k* illustrated in FIG. 25 is different from the unit pixels 100 in the other embodiments in that a slit 156 is provided in the region of the second photoelectric converter 102, and no slit is formed in the first photoelectric converter 101.

The second photoelectric converter 102 is provided with a slit 156 having a quadrangular shape and having a long side in an oblique direction in the drawing. In the example illustrated in FIG. 25, the rectangular slit 156 is illustrated, but the cross-shaped slit 154 illustrated in FIG. 23 or the L-shaped slit 155 illustrated in FIG. 24 can be disposed in the second photoelectric converter 102. In the example illustrated in FIG. 25, one slit 156 is provided in the second photoelectric converter 102, but a plurality of slits 156 may be provided in the second photoelectric converter 102.

In this way, in a case where the slit 156 is provided in the second photoelectric converter 102, the sensitivity of the second photoelectric converter 102 can be also improved.

Twelfth Embodiment

Figure 26:
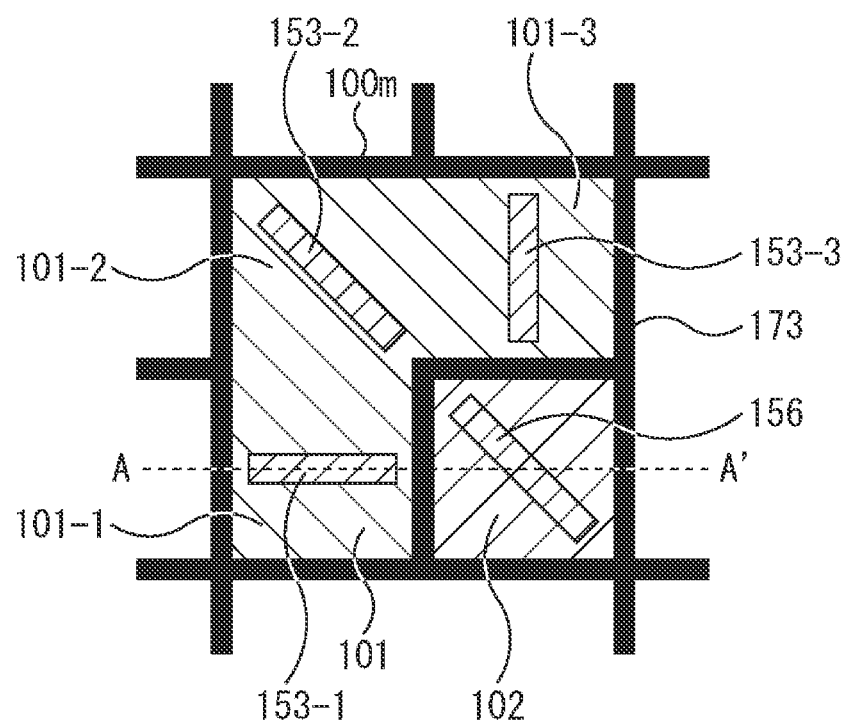
FIG. 26 is a diagram illustrating a planar configuration of a unit pixel according to a twelfth embodiment.
Figure 27:
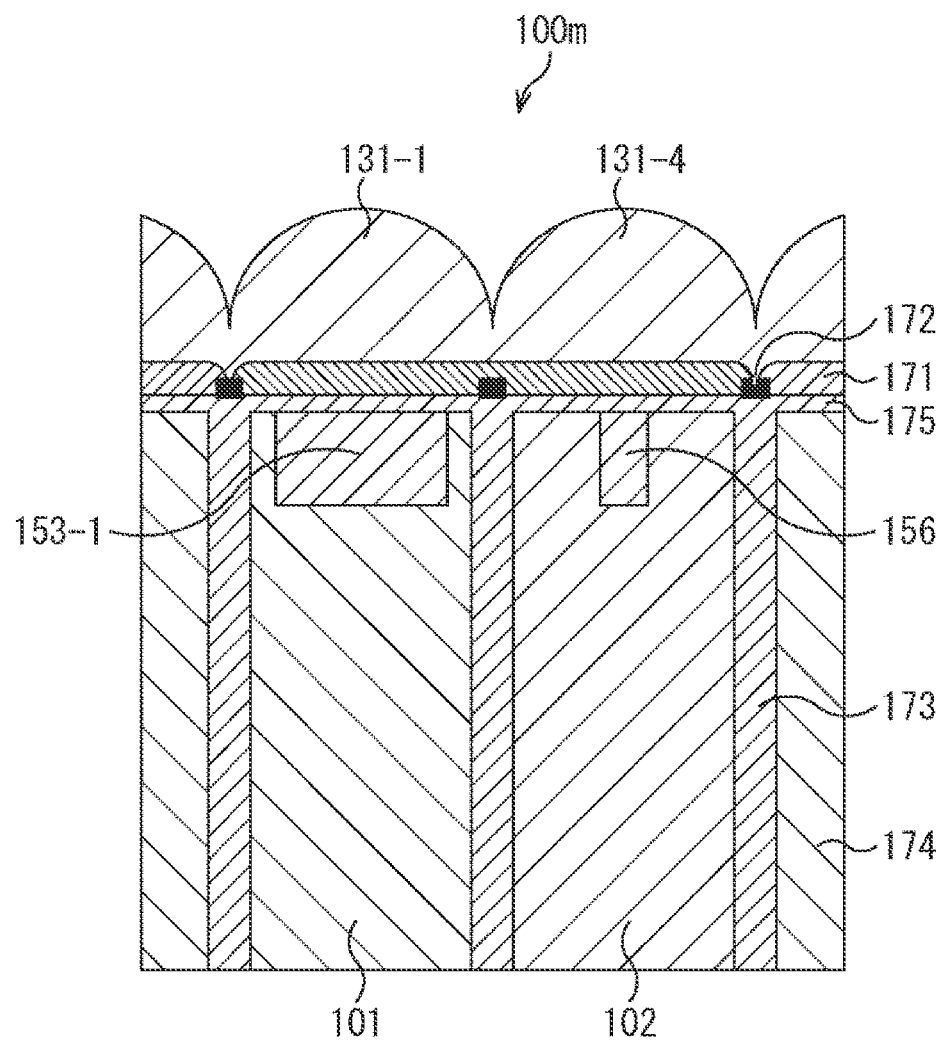
FIG. 27 is a diagram illustrating a sectional configuration of the unit pixel according to the twelfth embodiment.

FIGS. 26 and 27 are diagrams illustrating a configuration of a unit pixel 100*m* according to a twelfth embodiment.

The unit pixel 100*m* illustrated in FIG. 26 has a configuration in which a unit pixel f (FIG. 20) according to the sixth embodiment and the unit pixel 100*k* (FIG. 25) according to the eleventh embodiment are combined.

The unit pixel 100*m* has slits the 153-1, 153-2, and 153-3 in the first photoelectric converter 101 and the slit 156 in the second photoelectric converter 102.

FIG. 27 is a diagram illustrating a sectional configuration of the unit pixel 100*m* taken along the line segment A-A' illustrated in FIG. 26. FIG. 27 illustrates a sectional configuration example in a case where the unit pixel 100 (FIG. 5) in which three on-chip lenses 131 are disposed on the first photoelectric converter 101 is applied. The on-chip lens 131-1 and the on-chip lens 131-4 are disposed in the unit pixel 100*m*.

The slit 153-1 is formed under the on-chip lens 131-1 disposed on the first photoelectric converter 101. The slit 153-1 is formed with a predetermined depth at a position not in contact with the inter-pixel isolator 173. The slit 156 is formed under the on-chip lens 131-4 disposed on the second photoelectric converter 102. The slit 156 is formed with a predetermined depth near the center of the on-chip lens 131-4.

In this way, the slits 153 and 156 can be provided in both the first photoelectric converter 101 and the second photoelectric converter 102. Note that, in the description with reference to FIGS. 26 and 27, an example has been illustrated as described above in which the unit pixel f (FIG. 20) according to the sixth embodiment and the unit pixel 100*k* (FIG. 25) according to the eleventh embodiment are combined as described above. However, a mode may be adopted in which any of the unit pixels 100*g* to 100*j* (FIGS. 21 to 24) according to the seventh to tenth embodiments and the unit pixel 100*k* (FIG. 25) according to the eleventh embodiment are combined.

In this way, in a case where the slits 153 and 156 are provided in the first photoelectric converter 101 and the second photoelectric converter 102, respectively, the sensitivity of the first photoelectric converter 101 and the second photoelectric converter 102 can be improved.

Control of Traveling Direction of Light by Slit

Figure 28:
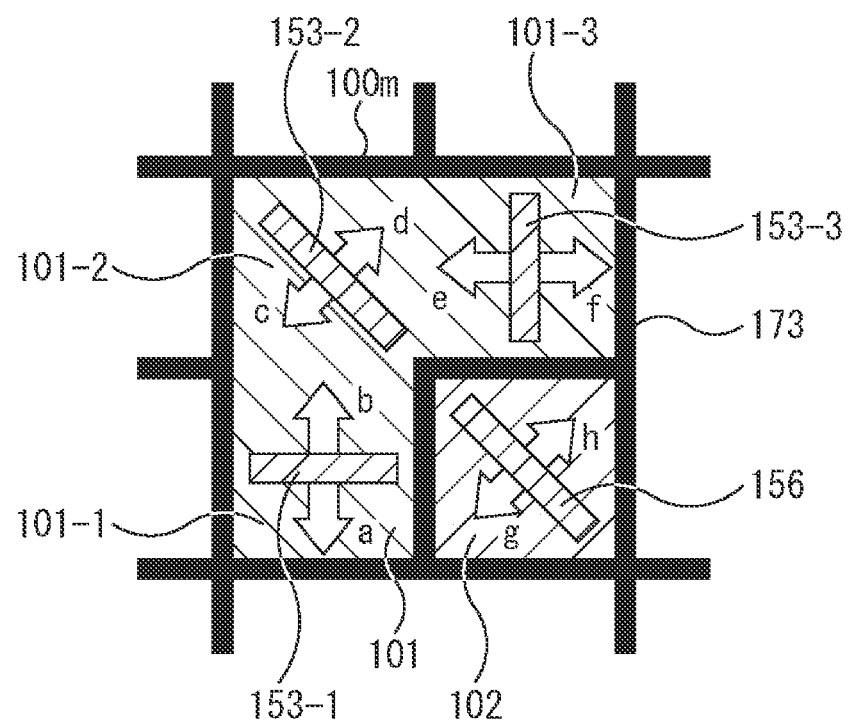
FIG. 28 is a diagram for describing directions of scattering of light by slits.

The control of the traveling direction of the incident light by providing the slits 151 to 156 will be described with reference to FIG. 28. The unit pixel 100*m* illustrated in FIG. 28 is the unit pixel 100*m* according to the twelfth embodiment illustrated in FIG. 26, and here, the description will be continued by using the unit pixel 100*m* as an example.

The light incident on the slit 153-1 formed in the first photoelectric converter 101 is scattered in a direction a or a direction b. The direction a and the direction b are directions perpendicular to the long side of the slit 153-1. The direction a is a direction toward the inter-pixel isolator 173 located on the lower side in the drawing of the unit pixel 100*m*, and the direction b is a direction toward the inter-pixel isolator 173 located on the upper side in the drawing of the unit pixel 100*m*. The light scattered by the slit 153-1 travels into the first photoelectric converter 101 and does not travel toward the second photoelectric converter 102.

The light incident on the slit 153-2 formed in the first photoelectric converter 101 is scattered in a direction c or a direction d. The direction c and the direction d are directions perpendicular to the long side of the slit 153-2. The direction c is a direction toward the inter-pixel isolator 173 located on the left side in the drawing of the unit pixel 100*m*, and the direction d is a direction toward the inter-pixel isolator 173 located on the upper side in the drawing of the unit pixel 100*m*. The light scattered by the slit 153-2 travels into the first photoelectric converter 101 and does not travel toward the second photoelectric converter 102.

The light incident on the slit 153-3 formed in the first photoelectric converter 101 is scattered in a direction e or a direction f. The direction e and the direction f are directions perpendicular to the long side of the slit 153-3. The direction e is a direction toward the inter-pixel isolator 173 located on the left side in the drawing of the unit pixel 100*m*, and the direction f is a direction toward the inter-pixel isolator 173 located on the right side in the drawing of the unit pixel 100*m*. The light scattered by the slit 153-3 travels into the first photoelectric converter 101 and does not travel toward the second photoelectric converter 102.

In this way, the slit 153 formed in the first photoelectric converter 101 is disposed such that the long side faces the inside of the first photoelectric converter 101 and the short side faces the second photoelectric converter 102.

The slit 153 provided in the first photoelectric converter 101 scatters the incident light into the first photoelectric converter 101, but does not scatter the incident light toward the second photoelectric converter 102. Therefore, the light scattered by the slit 153 can be prevented from leaking into the second photoelectric converter 102.

The slit 156 formed in the second photoelectric converter 102 is disposed such that the long side faces the inside of the second photoelectric converter 102 and the short side faces the first photoelectric converter 101.

The light incident on the slit 156 formed in the second photoelectric converter 102 is scattered in a direction g or a direction h. The direction g and the direction h are directions perpendicular to the long side of the slit 156. The direction g is a direction toward the inter-pixel isolator 173 located on the lower side in the drawing of the unit pixel 100m, and the direction h is a direction toward the inter-pixel isolator 173 located on the right side in the drawing of the unit pixel 100m. The light scattered by the slit 156 travels into the second photoelectric converter 102 and less light travels toward the first photoelectric converter 101.

In this way, the slit 156 provided in the second photoelectric converter 102 scatters the incident light into the second photoelectric converter 102, and reduces the light traveling toward the first photoelectric converter 101. It is therefore possible to reduce leakage of the light scattered by the slit 156 into the first photoelectric converter 101.

In this way, by arranging the slit 153 provided in the first photoelectric converter 101 so that the short side faces the second photoelectric converter 102, it is possible to reduce leakage of light from the first photoelectric converter 101 to the second photoelectric converter 102. Similarly, by arranging the slit 156 provided in the second photoelectric converter 102 so that the short side faces the first photoelectric converter 101, it is possible to reduce leakage of light from the second photoelectric converter 102 to the first photoelectric converter 101.

In the sixth to twelfth embodiments described above, basically, the short side of the slit is disposed to face the first photoelectric converter 101 (large pixel) or the second photoelectric converter 102 (small pixel). Therefore, in the unit pixels 100f to 100m according to the sixth to twelfth embodiments, it is possible to prevent light from leaking from the large pixel to the small pixel and from the small pixel to the large pixel.

Thirteenth Embodiment

Figure 29:
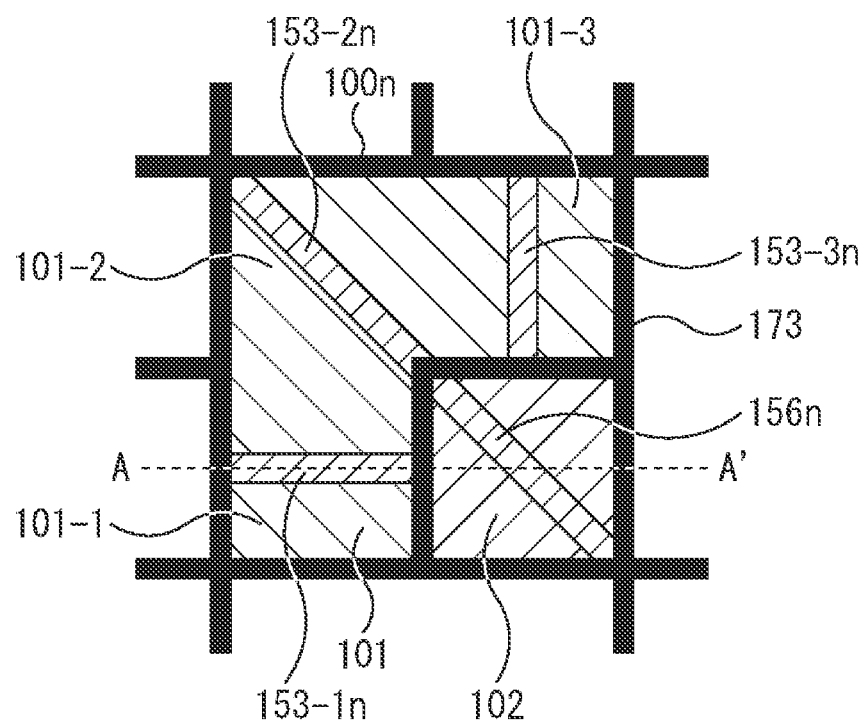
FIG. 29 is a diagram illustrating a planar configuration of a unit pixel according to a thirteenth embodiment.
Figure 30:
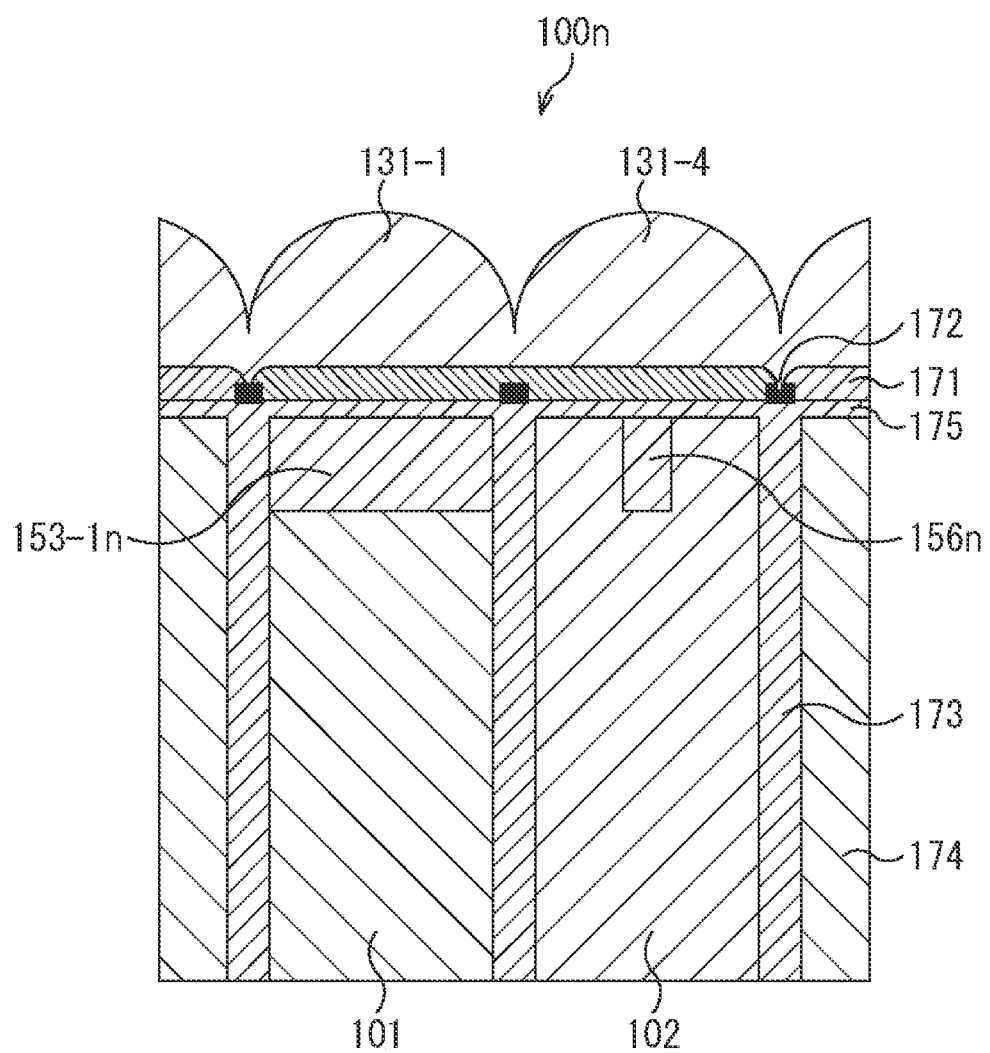
FIG. 30 is a diagram illustrating a sectional configuration of the unit pixel according to the thirteenth embodiment.

FIGS. 29 and 30 are diagrams illustrating a configuration of a unit pixel 100n according to a thirteenth embodiment. The unit pixel 100n according to the thirteenth embodiment illustrated in FIGS. 29 and 30 exemplifies a case where the thirteenth embodiment is applied to the unit pixel 100m (FIG. 26, FIG. 27) according to the twelfth embodiment.

In the unit pixel 100n illustrated in FIGS. 29 and 30, the shapes of the slit 153 and a slit 156n are different from the shapes of the slit 153 and the slit 156 of the unit pixel 100m illustrated in FIGS. 26 and 27, and the other points are similar.

A slit 153-1n formed in the first photoelectric converter 101-1 of the unit pixel 100n is formed so as to be in contact with the inter-pixel isolator 173. The short side of the slit 153-1n on the left side in the drawing is in contact with the inter-pixel isolator 173 on the left side in the drawing, and the short side of the slit 153-1n on the right side in the drawing is formed at such a position and has such a size as to be in contact with the inter-pixel isolator 173 formed between the first photoelectric converter 101 and the second photoelectric converter 102.

A slit 153-2n formed in the first photoelectric converter 101-2 of the unit pixel 100n is formed so as to be in contact with the inter-pixel isolator 173. A short side of the slit 153-2n on the upper left side in the drawing is in contact with a portion where the inter-pixel isolator 173 on the upper left side in the drawing intersects, and the short side of the slit 153-2n on the lower right side in the drawing is formed at such a position and has such a size as to be in contact with the inter-pixel isolator 173 formed between the first photoelectric converter 101 and the second photoelectric converter 102.

A slit 153-3n formed in the first photoelectric converter 101-3 of the unit pixel 100n is formed so as to be in contact with the inter-pixel isolator 173. The short side of the slit 153-3n on the upper side in the drawing is in contact with the inter-pixel isolator 173 on the upper side in the drawing, and the short side of the slit 153-3n on the lower side in the drawing is formed at such a position and has such a size as to be in contact with the inter-pixel isolator 173 formed between the first photoelectric converter 101 and the second photoelectric converter 102.

The slit 156n formed in the second photoelectric converter 102 of the unit pixel 100n is formed so as to be in contact with the inter-pixel isolator 173. The short side of the slit 156n on the upper left side in the drawing is in contact with the inter-pixel isolator 173 formed between the first photoelectric converter 101 and the second photoelectric converter 102, and the short side of the slit 156n on the lower right side in the drawing is formed at such a position and has such a size as to be in contact with a portion where the inter-pixel isolator 173 on the lower right side in the drawing intersects.

Referring to FIG. 30 which is a sectional view taken along a line segment A-A' illustrated in FIG. 29, the slit 153-1n is formed from the inter-pixel isolator 173 on the left side in the drawing to the inter-pixel isolator 173 on the right side in the drawing under the on-chip lens 131-1. Under the on-chip lens 131-4, the slit 156n is formed in a region corresponding to a vicinity of the center of the on-chip lens 131-4.

In this way, in a case where the slits 153-1n to 153-3n and 156n are configured to be in contact with the inter-pixel isolator 173, each of the slits 153-1n to 153-3n and 156n and the inter-pixel isolator 173 may be integrated. For example, the slits 153-1n to 153-3n and 156n and the inter-pixel isolator 173 can include the same material, for example, SiO2.

Of course, the slits 153-1n to 153-3n and 156n and the inter-pixel isolator 173 can include different materials. For example, the slits 153-1n to 153-3n and 156n may include SiO2, and the inter-pixel isolator 173 can include metal (a metal film may be formed in the inter-pixel isolator 173).

By providing the slits 153-1n to 153-3n having such a shape in the first photoelectric converter 101, the sensitivity of the first photoelectric converter 101 can be improved. In addition, by providing the slit 156n having such a shape in the second photoelectric converter 102, the sensitivity of the second photoelectric converter 102 can be improved.

Note that, in the description with reference to FIGS. 29 and 30, an example has been illustrated as described above in which the unit pixel m (FIG. 26) according to the twelfth embodiment and the thirteenth embodiment are combined as described above. However, it is also possible to combine the thirteenth embodiment with any of the unit pixels 100f to 100j (FIGS. 20 to 24) according to the sixth to eleventh embodiments so that the slit provided in the unit pixel 100 is in contact with the inter-pixel isolator 173.

Fourteenth Embodiment

Figure 31:
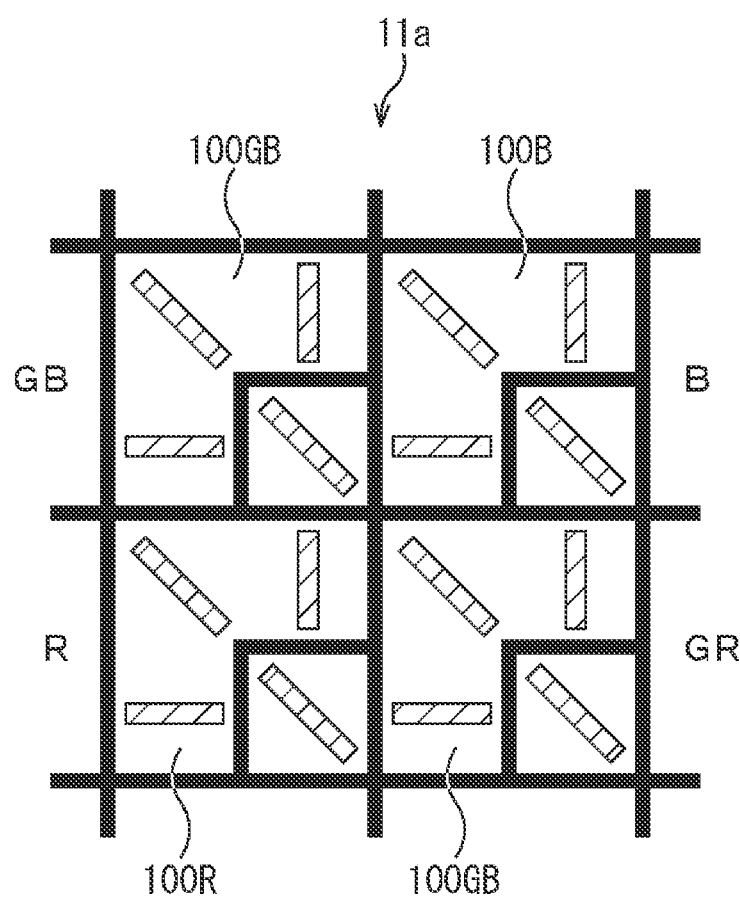
FIG. 31 is a diagram illustrating a configuration of a pixel array unit according to a fourteenth embodiment.

FIG. 31 is a schematic diagram illustrating a configuration example of a pixel array unit 11a according to a fourteenth embodiment. In a case where the color filter layer 171 is provided, a unit pixel provided with a slit or a unit pixel provided with no slit can be set in accordance with the color of the color filter layer 171. In the following description, a case will be described as an example where the unit pixel 100m according to the twelfth embodiment is disposed in the unit pixel 100 provided with a slit. However, any of the unit pixels 100a to 100n according to the first to thirteenth embodiments described above can be applied.

FIG. 31 illustrates four unit pixels 100 in 2×2 disposed in the pixel array unit 11a. A unit pixel 100GB on the upper left side in the drawing is a unit pixel provided with a green color filter layer 171. A unit pixel 100B on the upper right side in the drawing is a unit pixel provided with a blue color filter layer 171. A unit pixel 100R on the lower left side in the drawing is a unit pixel provided with a red color filter layer 171. A unit pixel 100GR on the lower right side in the drawing is a unit pixel provided with a green color filter layer 171.

The example illustrated in FIG. 31 is an example in which slits are provided in all the unit pixels 100 disposed in the pixel array unit 11a. Slits are provided in both the first photoelectric converter 101 and the second photoelectric converter 102 included in the unit pixel 100GB, the unit pixel 100B, the unit pixel 100R, and the unit pixel 100GB.

In this way, by providing slits in the first photoelectric converters 101 and the second photoelectric converters 102 of all the unit pixels 100 disposed in the pixel array unit 11a, the sensitivity of all the unit pixels 100 can be improved.

Fifteenth Embodiment

Figure 32:
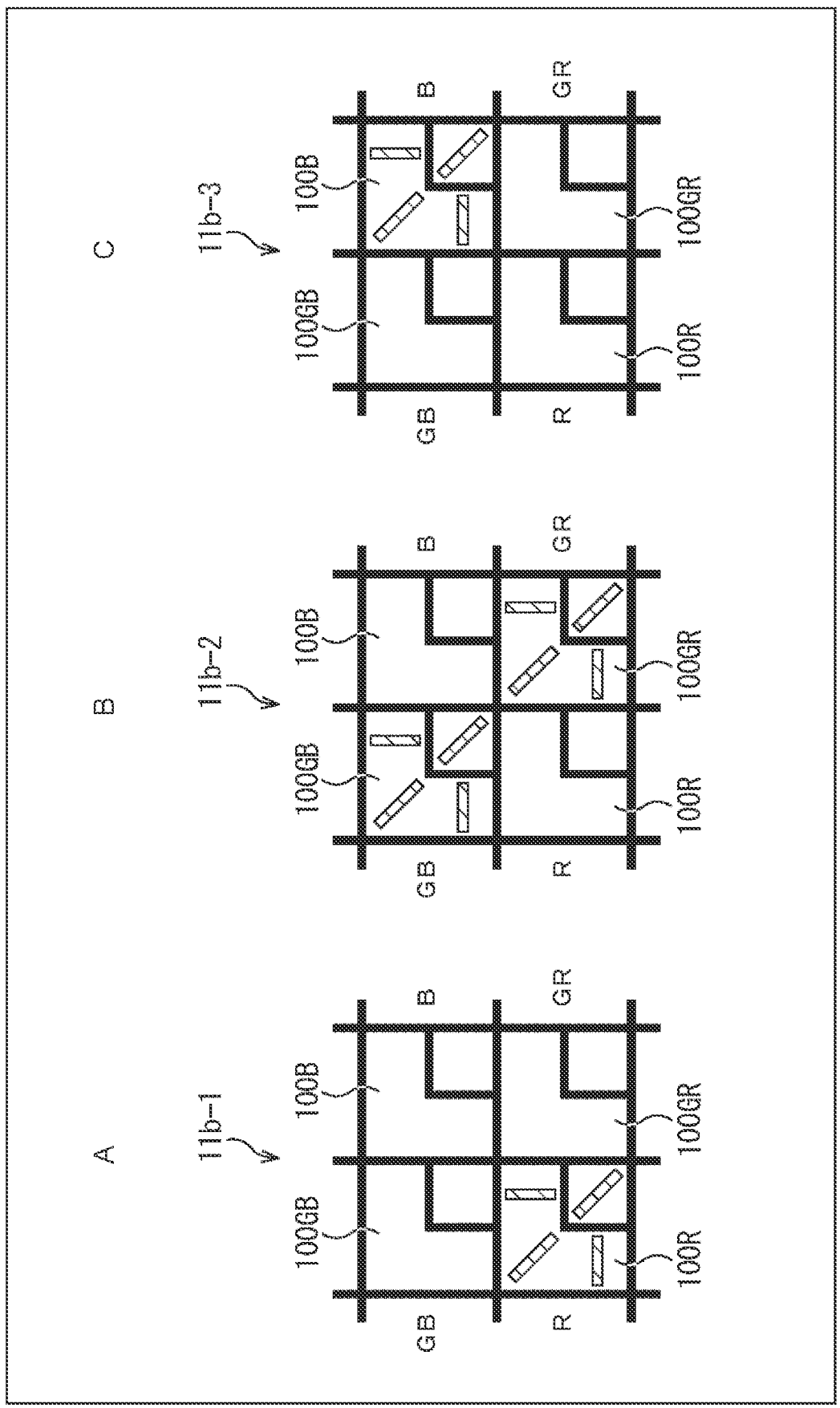
FIG. 32 is a diagram illustrating a configuration of a pixel array unit according to a fifteenth embodiment.

FIG. 32 is a schematic diagram illustrating a configuration example of a pixel array unit 11b according to a fifteenth embodiment.

In a pixel array unit 11b-1 illustrated in A of FIG. 32, slits are provided in both the first photoelectric converter 101 and the second photoelectric converter 102 of the unit pixel 100R in which the red color filter layer 171 is disposed, and no slit is provided in the unit pixel 100GB, the unit pixel 100B, and the unit pixel 100GR. In this case, the sensitivity of the unit pixel 100R, which is an R pixel, can be improved as compared with the other unit pixels 100.

In a pixel array unit 11b-2 illustrated in B of FIG. 32, slits are provided in both the first photoelectric converter 101 and the second photoelectric converter 102 of each of the unit pixel 100GB and the unit pixel GR in which the green color filter layer 171 is disposed, and no slit is provided in the unit pixel 100B and the unit pixel 100R. In this case, the sensitivity of the unit pixel GB and the unit pixel 100GR, which are G pixels, can be improved as compared with the other unit pixels 100.

In a pixel array unit 11b-3 illustrated in C of FIG. 32, slits are provided in both the first photoelectric converter 101 and the second photoelectric converter 102 of the unit pixel 100B in which the blue color filter layer 171 is disposed, and no slit is provided in the unit pixel 100GB, the unit pixel 100R, and the unit pixel 100GR. In this case, the sensitivity of the unit pixel 100B, which is a B pixel, can be improved as compared with the other unit pixels 100.

In this way, the slit may be provided in the unit pixel 100 in which the color filter layer 171 of a color desired to have higher sensitivity than the other unit pixels 100 is disposed.

Sixteenth Embodiment

Figure 33:
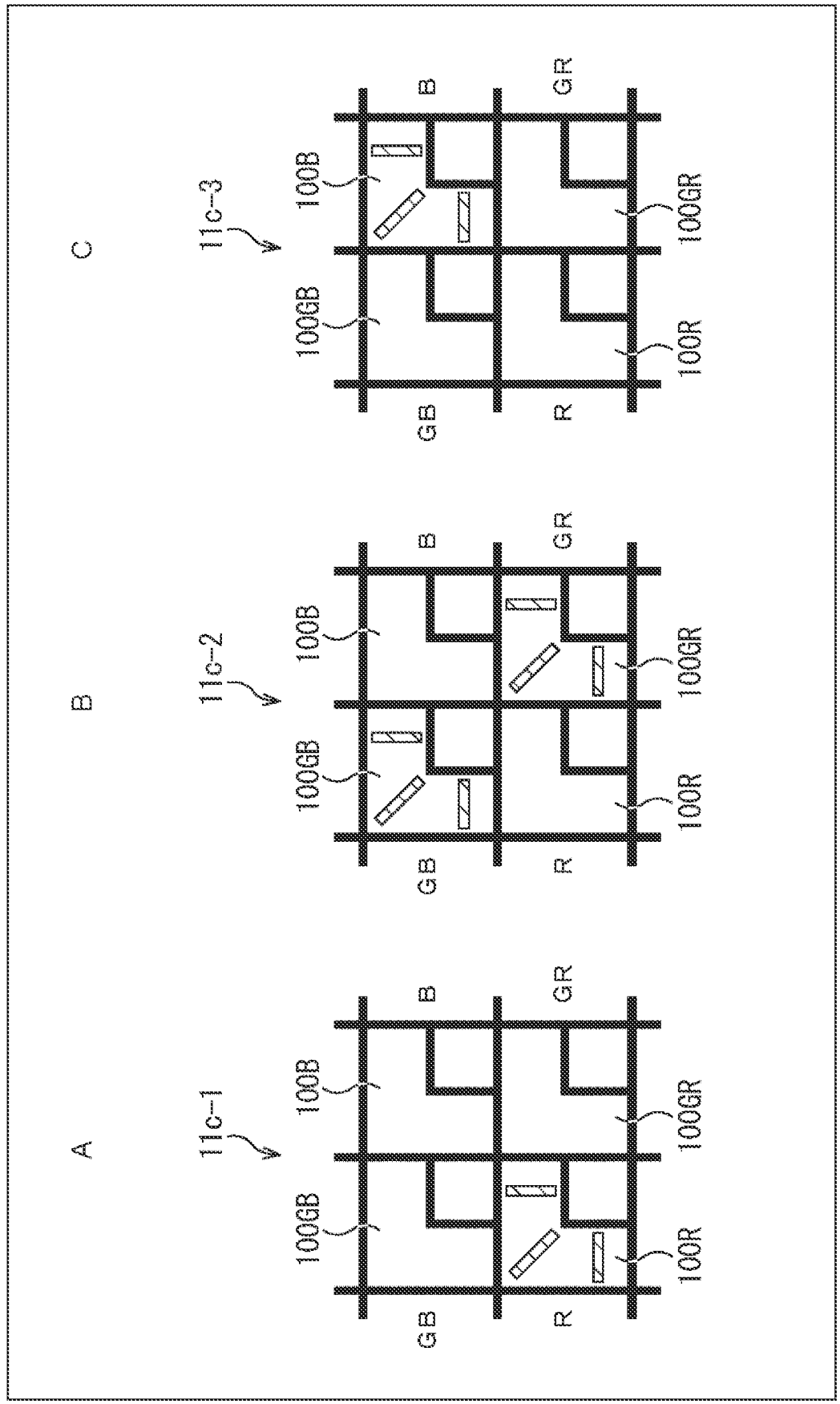
FIG. 33 is a diagram illustrating a configuration of a pixel array unit according to a sixteenth embodiment.

FIG. 33 is a schematic diagram illustrating a configuration example of a pixel array unit 11c according to a sixteenth embodiment.

In a pixel array unit 11c-1 illustrated in A of FIG. 33, slits are provided in the first photoelectric converter 101 of the unit pixel 100R in which the red color filter layer 171 is disposed, and no slit is provided in the second photoelectric converter 102. No slit is provided in the unit pixel 100GB, the unit pixel 100B, and the unit pixel 100GR. In this case, the sensitivity of the first photoelectric converter 101 (large pixel) of the unit pixel 100R, which is an R pixel, can be improved as compared with the first photoelectric converters 101 of the other unit pixels 100.

In a pixel array unit 11c-2 illustrated in B of FIG. 33, slits are provided in the first photoelectric converter 101 of each of the unit pixel 100GB and the unit pixel GR in which the green color filter layer 171 is disposed, and no slit is provided in the second photoelectric converter 102. No slit is provided in the unit pixel 100B and the unit pixel 100R. In this case, the sensitivity of the first photoelectric converter 101 (large pixel) of the unit pixel GB and the unit pixel 100GR, which are G pixels, can be improved as compared with the first photoelectric converters 101 of the other unit pixels 100.

In a pixel array unit 11c-3 illustrated in C of FIG. 33, slits are provided in the first photoelectric converter 101 of the unit pixel 100B in which the blue color filter layer 171 is disposed, and no slit is provided in the second photoelectric converter 102. No slit is provided in the unit pixel 100GB, the unit pixel 100R, and the unit pixel 100GR. In this case, the sensitivity of the first photoelectric converter 101 (large pixel) of the unit pixel 100B, which is a B pixel, can be improved as compared with the first photoelectric converters 101 of the other unit pixels 100.

In this way, the slit may be provided in the first photoelectric converter 101 of the unit pixel 100 in which the color filter layer 171 of a color desired to have higher sensitivity than the other unit pixels 100 is disposed.

Seventeenth Embodiment

Figure 34:
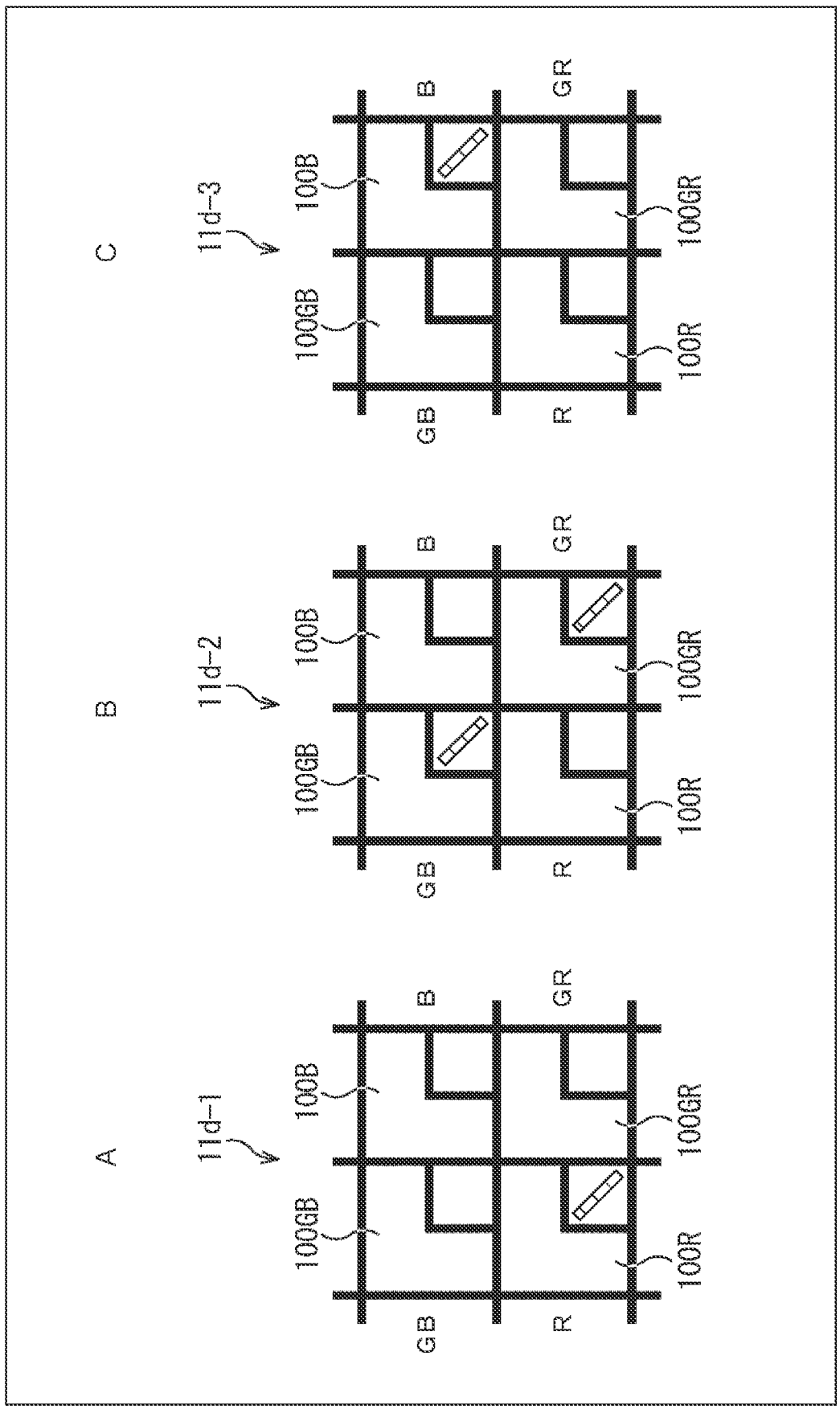
FIG. 34 is a diagram illustrating a configuration of a pixel array unit according to a seventeenth embodiment.

FIG. 34 is a schematic diagram illustrating a configuration example of a pixel array unit 11d according to a seventeenth embodiment.

In a pixel array unit 11d-1 illustrated in A of FIG. 34, slits are provided in the second photoelectric converter 102 of the unit pixel 100R in which the red color filter layer 171 is disposed, and no slit is provided in the first photoelectric converter 101. No slit is provided in the unit pixel 100GB, the unit pixel 100B, and the unit pixel 100GR. In this case, the sensitivity of the second photoelectric converter 102 (small pixel) of the unit pixel 100R, which is an R pixel, can be improved as compared with the second photoelectric converters 102 of the other unit pixels 100.

In a pixel array unit 11d-2 illustrated in B of FIG. 34, slits are provided in the second photoelectric converter 102 of each of the unit pixel 100GB and the unit pixel GR in which the green color filter layer 171 is disposed, and no slit is provided in the first photoelectric converter 101. No slit is provided in the unit pixel 100B and the unit pixel 100R. In this case, the sensitivity of the second photoelectric converter 102 (small pixel) of the unit pixel GB and the unit pixel 100GR, which are G pixels, can be improved as compared with the second photoelectric converters 102 of the other unit pixels 100.

In a pixel array unit 11d-3 illustrated in C of FIG. 34, slits are provided in the second photoelectric converter 102 of the unit pixel 100B in which the blue color filter layer 171 is disposed, and no slit is provided in the first photoelectric converter 101. No slit is provided in the unit pixel 100GB, the unit pixel 100R, and the unit pixel 100GR. In this case, the sensitivity of the second photoelectric converter 102 (small pixel) of the unit pixel 100B, which is a B pixel, can be improved as compared with the second photoelectric converters 102 of the other unit pixels 100.

In this way, the slit may be provided in the second photoelectric converter 102 of the unit pixel 100 in which the color filter layer 171 of a color desired to have higher sensitivity than the other unit pixels 100 is disposed.

In the present technology, the unit pixel 100 can include the first photoelectric converter 101 and the second photoelectric converter 102 having different sizes. The first photoelectric converter 101 and the second photoelectric converter 102 can be disposed without generating an unnecessary gap between the first photoelectric converter 101 and the second photoelectric converter 102.

By providing the slit in the unit pixel 100, incident light can be scattered and confined in the photoelectric converter. Therefore, the sensitivity can be improved.

A slit can be provided in both or either the first photoelectric converter 101 or the second photoelectric converter 102, or a slit can be provided only in a desired photoelectric converter whose sensitivity is desired to be improved, and sensitivity adjustment such as improving the sensitivity of the entire unit pixel 100 or improving only the sensitivity of the desired photoelectric converter can be performed.

By adjusting the position and direction of the slit, it is possible to prevent light from leaking into the first photoelectric converter 101 or the second photoelectric converter 102, and color mixing between large and small pixels can be suppressed.

Example Applications to Electronic Devices

The present technology can be applied to all electronic devices using an imaging element in an image capturer (photoelectric converter), such as an imaging apparatus like a digital still camera or a video camera, a mobile terminal device having an imaging function, and a copying machine using an imaging element in an image reader. An imaging element may be formed as one chip, or may be in a modular form having an imaging function in which an imaging unit and a signal processor or an optical system are packaged together.

Figure 35:
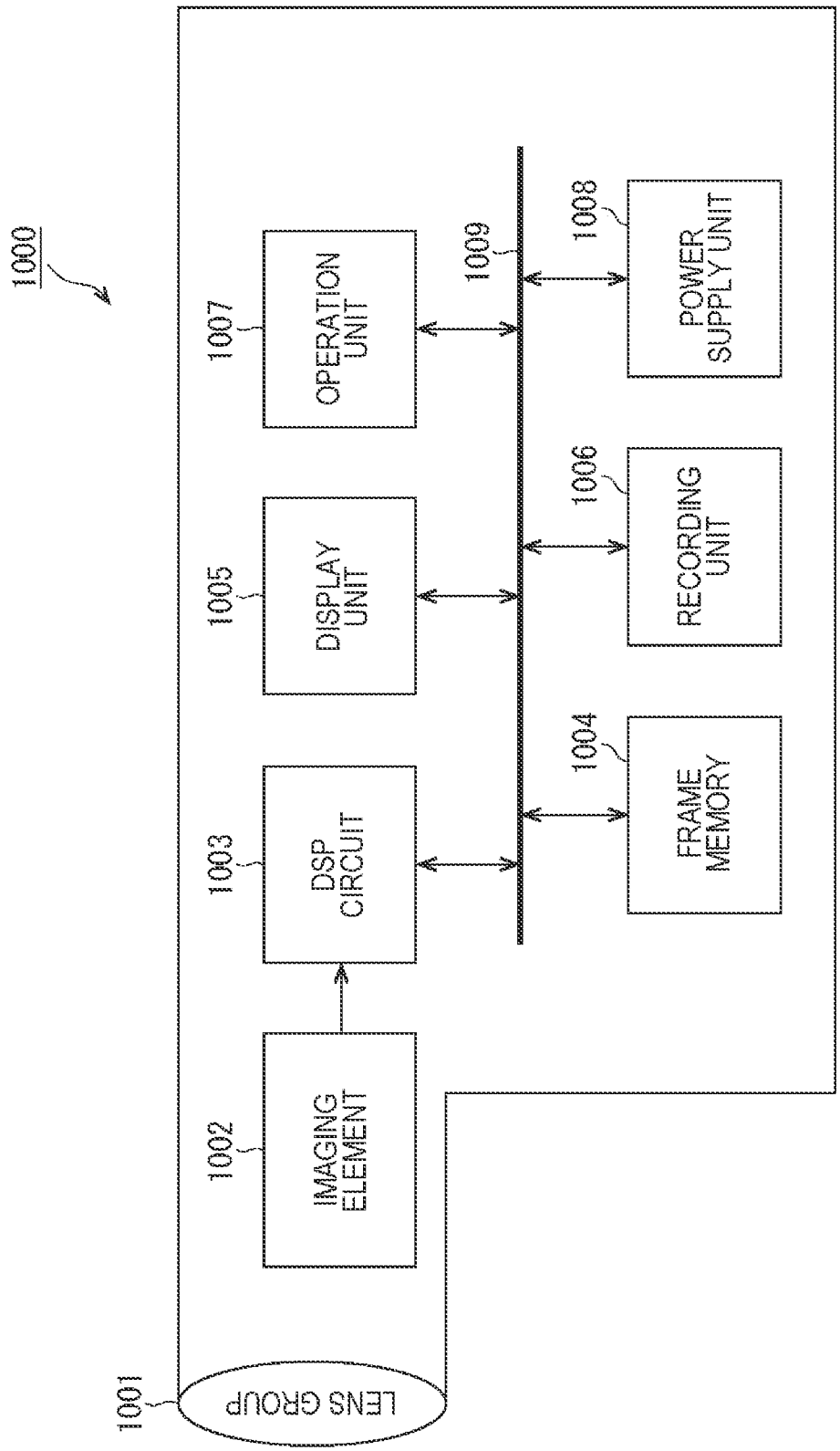
FIG. 35 is a diagram illustrating a configuration of an example of an electronic device.

FIG. 35 is a block diagram illustrating a configuration example of an imaging apparatus as an electronic device to which the present technology is applied.

An imaging apparatus 1000 in FIG. 35 is provided with an optical unit 1001 including a lens group and the like, an imaging element (imaging device) 1002 to which the configuration of the imaging apparatus 10 in FIG. 1 is adopted, and a digital signal processor (DSP) circuit 1003 being a camera signal processing circuit. Furthermore, the imaging apparatus 1000 also includes a frame memory 1004, a display unit 1005, a recording unit 1006, an operation unit 1007, and a power supply unit 1008. The DSP circuit 1003, the frame memory 1004, the display unit 1005, the recording unit 1006, the operation unit 1007, and the power supply unit 1008 are connected to one another via a bus line 1009.

The optical unit 1001 captures incident light (image light) from an object, and forms an image on the imaging surface of the imaging element 1002. The imaging element 1002 converts the amount of the incident light the image of which is formed on the imaging surface by the optical unit 1001, into an electric signal on a pixel basis, and outputs the electric signal as a pixel signal. As the imaging element 1002, the imaging apparatus 10 in FIG. 1 can be used.

The display unit 1005 is formed with a flat-panel display such as a liquid crystal display (LCD) or an organic electro luminescence (EL) display, for example, and displays a video image or a still image formed by the imaging element 1002. The recording unit 1006 records the video image or the still image captured by the imaging element 1002 in a recording medium such as a hard disk or a semiconductor memory.

The operation unit 1007 issues an operation command regarding various functions of the imaging apparatus 1000 under operation by a user. The power supply unit 1008 appropriately supplies various kinds of power that is the operating power supply for the DSP circuit 1003, the frame memory 1004, the display unit 1005, the recording unit 1006, and the operation unit 1007, to these supply targets.

Practical Application Example to Mobile Body

The technology of the present disclosure (present technology) can be applied to various products. For example, the technology of the present disclosure may be achieved in a form of an apparatus to be mounted to a mobile body of any kind such as an automobile, an electric vehicle, a hybrid electric vehicle, a motorcycle, a bicycle, a personal mobility, an airplane, a drone, a vessel, and a robot.

Figure 36:
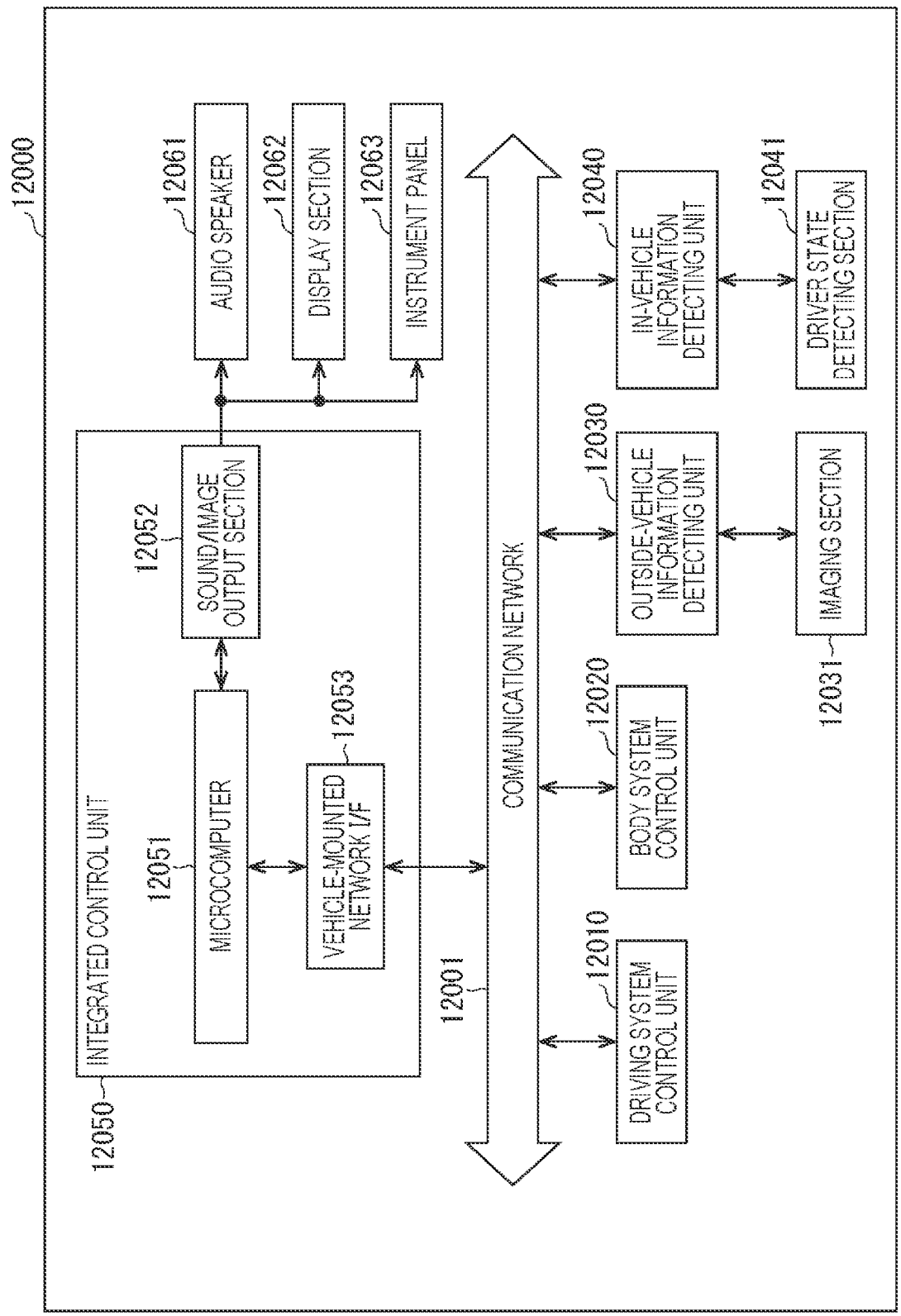
FIG. 36 is a block diagram illustrating an example of a schematic configuration of a vehicle control system.

FIG. 36 is a block diagram illustrating a schematic configuration example of a vehicle control system as an example of a mobile body control system to which the technology of the present disclosure is applied.

The vehicle control system 12000 includes a plurality of electronic control units connected to each other via a communication network 12001. In the example illustrated in FIG. 36, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 36, an audio speaker 12061, a display section 12062, and an instrument panel 12063 are exemplified as the output device. The display section 12062 may, for example, include at least one of an on-board display and a head-up display.

Figure 37:
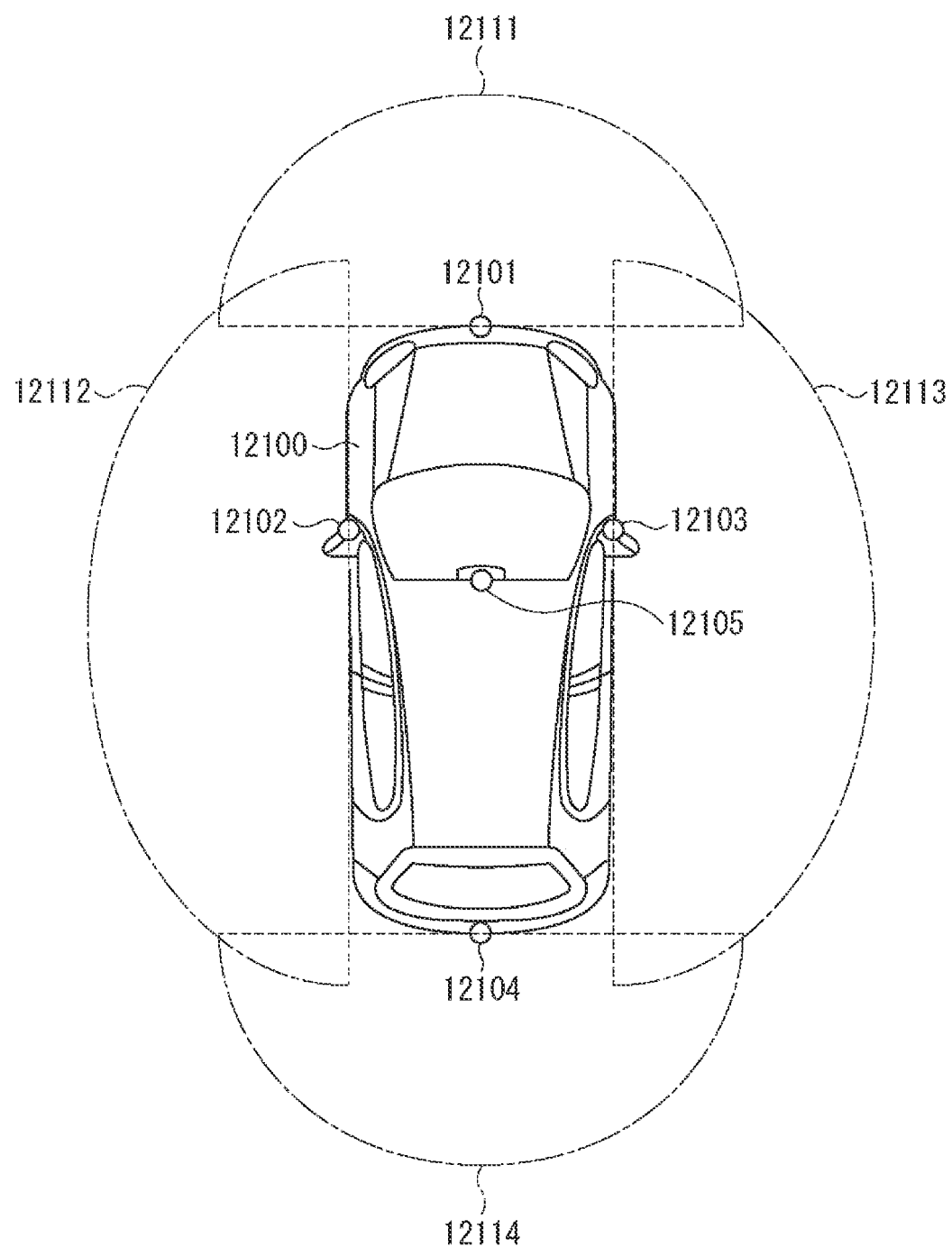
FIG. 37 is an explanatory diagram illustrating an example of installation positions of an outside-vehicle information detecting section and imaging sections.

FIG. 37 is a diagram illustrating an example of an installation position of the imaging section 12031.

In FIG. 37, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that FIG. 37 illustrates an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

In the present specification, the system represents the entire device including a plurality of devices.

Note that the effects described in the present specification are merely examples and are not limited, and there may be other effects.

Note that the embodiments of the present technology are not limited to the above-described embodiments, and various changes can be made without departing from the gist of the present technology.

Note that the present technology may also have the following configurations.

(1)
An imaging element includes
a first photoelectric converter that generate a charge corresponding to a light amount, and
a second photoelectric converter having a smaller light receiving area than the first photoelectric converter, in which
the first photoelectric converter has an L shape in plan view,
the second photoelectric converter has a quadrangular shape, and
a shape obtained by combining the first photoelectric converter and the second photoelectric converter is a quadrangular shape.

(2)
In the imaging element according to (1),
a plurality of on-chip lenses is disposed on the first photoelectric converter.

(3)
In the imaging element according to (1) or (2),
the light receiving area of the first photoelectric converter is about three times the light receiving area of the second photoelectric converter,
three on-chip lenses are disposed on the first photoelectric converter, and
one on-chip lens having the same type as the on-chip lenses is disposed on the second photoelectric converter.

(4)
In the imaging element according to (1) or (2),
an on-chip lens of the same type of the first photoelectric converter is disposed on the first photoelectric converter.

(5)
In the imaging element according to any of (1) to (4),
the first photoelectric converter is provided with a slit on a light receiving surface side.

(6)
In the imaging element according to (5),
the slit is formed in a quadrangular shape under the on-chip lens.

(7)
In the imaging element according to (5),
the slit has the same type as the on-chip lens.

(8)
In the imaging element according to (5) or (6),
a plurality of the slit is formed under the on-chip lens.

(9)
In the imaging element according to any of (5) to (8),
the slit has a quadrangular shape, and a short side of the slit having the quadrangular shape faces the second photoelectric converter.

(10)
In the imaging element according to any of (1) to (9),
the second photoelectric converter is provided with a slit on a light receiving surface side.

(11)
In the imaging element according to (10),
the slit has a quadrangular shape, and a short side of the slit having the quadrangular shape faces the first photoelectric converter.

(12)
In the imaging element according to any of (5) to (11),
an inter-pixel isolator is formed between a first pixel including the first photoelectric converter and the second photoelectric converter and a second pixel adjacent to the first pixel, and the slit is formed up to a position to be in contact with the inter-pixel isolator.

(13) The imaging element according to any of (5) to (12) further includes
a color filter layer, in which
the slit is provided in the first photoelectric converter in which a predetermined color of the color filter layer is disposed.

(14) The imaging element according to any of (5) to (13) further includes
a color filter layer, in which
the slit is provided in the second photoelectric converter in which a predetermined color of the color filter layer is disposed.

(15) An electronic device includes
an imaging element, and
a processor that processes a signal from the imaging element,
the imaging element including
a first photoelectric converter that generate a charge corresponding to a light amount, and
a second photoelectric converter having a smaller light receiving area than the first photoelectric converter, in which
the first photoelectric converter has an L shape in plan view,
the second photoelectric converter has a quadrangular shape, and
a shape obtained by combining the first photoelectric converter and the second photoelectric converter is a quadrangular shape.

REFERENCE SIGNS LIST

10 Imaging apparatus
11 Pixel array unit
12 Vertical drive unit
13 Column processor
14 Horizontal drive unit
15 System controller
16 Pixel drive line
17 Vertical signal line
18 Signal processor
19 Data storage
100 Unit pixel
101 First photoelectric converter
102 Second photoelectric converter
103 First transfer transistor
104 Second transfer transistor
105 Third transfer transistor
106 Fourth transfer transistor
107 FD unit
108 Reset transistor
109 Amplification transistor
110 Selection transistor
111 Charge accumulator
112 Node
113 Node
121 Current source
131 On-chip lens
151 to 156 Slit
171 Color filter layer
172 Light shielding film
173 Inter-pixel isolator
174 Silicon substrate
175 Oxide film

What is claimed is:

1. An imaging element, comprising:
a first photoelectric converter that generates a charge corresponding to a light amount; and
a second photoelectric converter having a smaller light receiving area than the first photoelectric converter, wherein
the first photoelectric converter has an L shape in plan view,
the first photoelectric converter includes a slit on a light receiving surface side, the slit having an L-shape in the plan view,
the second photoelectric converter has a quadrangular shape, and
a shape obtained by combining the first photoelectric converter and the second photoelectric converter is a quadrangular shape.

2. The imaging element according to claim 1, wherein
a plurality of on-chip lenses is disposed on the first photoelectric converter.

3. The imaging element according to claim 1, wherein
the light receiving area of the first photoelectric converter is about three times the light receiving area of the second photoelectric converter,
three on-chip lenses are disposed on the first photoelectric converter, and
one on-chip lens having a same type as the on-chip lenses is disposed on the second photoelectric converter.

4. The imaging element according to claim 1, wherein
an on-chip lens of a same type of the first photoelectric converter is disposed on the first photoelectric converter.

5. The imaging element according to claim 1, wherein
the second photoelectric converter is provided with a slit on a light receiving surface side.

6. The imaging element according to claim 5, wherein
the slit has a quadrangular shape, and a short side of the slit having the quadrangular shape faces the first photoelectric converter.

7. The imaging element according to claim 1, wherein
an inter-pixel isolator is formed between a first pixel including the first photoelectric converter and the second photoelectric converter and a second pixel adjacent to the first pixel, and
the slit is formed up to a position to be in contact with the inter-pixel isolator.

8. The imaging element according to claim 1, further comprising:
a color filter layer, wherein
the slit is provided in the first photoelectric converter in which a predetermined color of the color filter layer is disposed.

9. The imaging element according to claim 1, further comprising:
a color filter layer, wherein
the slit is provided in the second photoelectric converter in which a predetermined color of the color filter layer is disposed.

10. The imaging element according to claim 1, wherein
the L-shaped slit is formed in a central portion of the first photoelectric converter.

11. The imaging element according to claim 1, wherein
the slit comprises a trench that does not penetrate a silicon substrate in which the first photoelectric converter is formed.

12. The imaging element according to claim 1, wherein the slit is filled with a material having a different refractive index than a silicon substrate in which the first photoelectric converter is formed.

13. The imaging element according to claim 1, further comprising:
an inter-pixel isolator, wherein the slit is formed up to a position to be in contact with the inter-pixel isolator.

14. The imaging element according to claim 1, further comprising:
three on-chip lenses disposed on the first photoelectric converter and one on-chip lens disposed on the second photoelectric converter.

15. The imaging element according to claim 1, further comprising:
a slit disposed on a light receiving surface side of the second photoelectric converter.

16. The imaging element according to claim 15, wherein the slit disposed on the second photoelectric converter has a quadrangular shape, and
a short side of the quadrangular shape faces the first photoelectric converter.

17. The imaging element according to claim 1, further comprising:
a color filter layer disposed over the first photoelectric converter, wherein the color filter layer is a red color filter.

18. The imaging element according to claim 1, wherein the L-shaped slit is filled with a metal.

19. An electronic device comprising:
an imaging element; and
a processor that processes a signal from the imaging element, the imaging element including
a first photoelectric converter that generate a charge corresponding to a light amount, and
a second photoelectric converter having a smaller light receiving area than the first photoelectric converter, wherein
the first photoelectric converter has an L shape in plan view,
the first photoelectric converter includes a slit on a light receiving surface side, the slit having an L-shape in the plan view,
the second photoelectric converter has a quadrangular shape, and
a shape obtained by combining the first photoelectric converter and the second photoelectric converter is a quadrangular shape.

20. An imaging apparatus, comprising:
a pixel array having a plurality of pixels, each pixel of the plurality of pixels comprising:
a first photoelectric converter having an L shape in plan view;
a second photoelectric converter having a quadrangular shape and a smaller light receiving area than the first photoelectric converter, wherein a shape obtained by combining the first and second photoelectric converters is a quadrangular shape;
an L-shaped slit formed on a light receiving surface side of a central portion of the first photoelectric converter;
a plurality of on-chip lenses, wherein three of the on-chip lenses are disposed over the first photoelectric converter and one of the on-chip lenses is disposed over the second photoelectric converter, and
an inter-pixel isolator formed between the first photoelectric converter and the second photoelectric converter; and
circuitry communicatively coupled to the pixel array and configured to process signals from the plurality of pixels.

* * * * *